United States Patent
Di Censo et al.

(10) Patent No.: US 10,279,739 B2
(45) Date of Patent: May 7, 2019

(54) MODIFYING AN AUDIO PANORAMA TO INDICATE THE PRESENCE OF DANGER OR OTHER EVENTS OF INTEREST

(71) Applicant: HARMAN INTERNATIONAL INDUSTRIES, INC., Stamford, CT (US)

(72) Inventors: Davide Di Censo, Sunnyvale, CA (US); Stefan Marti, Oakland, CA (US); Ajay Juneja, Mountain View, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/608,553

(22) Filed: May 30, 2017

(65) Prior Publication Data
US 2017/0291541 A1    Oct. 12, 2017

Related U.S. Application Data

(63) Continuation of application No. 14/059,359, filed on Oct. 21, 2013, now Pat. No. 9,663,031.

(51) Int. Cl.
| | |
|---|---|
| H04R 3/00 | (2006.01) |
| B60Q 5/00 | (2006.01) |
| H04S 3/00 | (2006.01) |
| H04S 7/00 | (2006.01) |
| G08B 3/10 | (2006.01) |
| G08G 1/005 | (2006.01) |
| G08G 1/16 | (2006.01) |

(Continued)

(52) U.S. Cl.
CPC ............. *B60Q 5/006* (2013.01); *G08B 3/10* (2013.01); *G08G 1/005* (2013.01); *G08G 1/166* (2013.01);

(Continued)

(58) Field of Classification Search
CPC .... G08G 1/166; G08G 1/0108; G08G 1/0962; G08G 3/10; G08G 1/005; G08G 1/167;
(Continued)

(56) References Cited

U.S. PATENT DOCUMENTS

| | | | | |
|---|---|---|---|---|
| 5,450,057 A | * | 9/1995 | Watanabe | B60Q 9/00 |
| | | | | 180/169 |
| 2003/0108212 A1 | * | 6/2003 | Yun | G01S 15/931 |
| | | | | 381/86 |

(Continued)

FOREIGN PATENT DOCUMENTS

| | | |
|---|---|---|
| CN | 101193460 A | 6/2008 |
| CN | 102869961 A | 1/2013 |

(Continued)

*Primary Examiner* — Thang V Tran
(74) *Attorney, Agent, or Firm* — Artegis Law Group, LLP

(57) ABSTRACT

A personal safety system detects imminent danger or other event of interest and then modifies a sound panorama to focus a user's attention towards the direction of the danger or other event of interest. The personal safety system may isolate sounds originating from the direction of the danger or other event of interest, collapse the sound panorama towards the direction of the danger or other event of interest, or compress the sound panorama to align with the direction of the danger or other event of interest. The personal safety system may be integrated into an automobile or a wearable system physically attached to the user. Advantageously, the attention of the user may be drawn towards imminent danger or other events of interest without introducing additional sensory information to the user, thereby reducing the likelihood of startling or distracting the user.

20 Claims, 18 Drawing Sheets

(51) Int. Cl.
*G10K 11/178* (2006.01)
*H04R 3/12* (2006.01)
*B60Q 9/00* (2006.01)

(52) U.S. Cl.
CPC ........... *G10K 11/178* (2013.01); *H04R 3/002* (2013.01); *H04S 3/00* (2013.01); *H04S 7/30* (2013.01); *B60Q 9/008* (2013.01); *G10K 2210/1282* (2013.01); *H04R 3/005* (2013.01); *H04R 3/12* (2013.01); *H04R 2420/01* (2013.01); *H04R 2420/03* (2013.01); *H04R 2430/00* (2013.01); *H04R 2499/13* (2013.01)

(58) Field of Classification Search
CPC .. G08G 1/096783; B60Q 9/006; B60Q 9/007; B60Q 9/008; B60Q 5/006; G08B 3/10; H04N 5/2259; B60R 11/04; B60R 2300/301; B60W 50/14; G10K 2210/1282; H04R 2420/01; H04R 2420/03; H04R 2430/00; H04R 2499/13; H04R 3/002; H04R 3/005; H04R 3/12; H04R 1/1083; H04S 3/00; H04S 7/30
See application file for complete search history.

(56) References Cited

U.S. PATENT DOCUMENTS

| | | |
|---|---|---|
| 2005/0213771 A1 | 9/2005 | Smaragdis et al. |
| 2010/0290632 A1* | 11/2010 | Lin ..................... G01S 3/8006 381/56 |
| 2013/0009791 A1* | 1/2013 | Yoshioka ............... G08G 1/166 340/935 |
| 2013/0188794 A1* | 7/2013 | Kawamata .............. G01S 3/803 381/56 |
| 2013/0328701 A1* | 12/2013 | Sato ........................ G01S 3/808 340/943 |
| 2014/0203925 A1* | 7/2014 | Augst .................... B60Q 9/007 340/435 |
| 2014/0241532 A1* | 8/2014 | Sato ...................... G01S 3/8083 381/56 |
| 2014/0254830 A1* | 9/2014 | Tomono ............... H04R 1/1041 381/107 |
| 2015/0104049 A1* | 4/2015 | Noda ..................... G06F 3/011 381/303 |

FOREIGN PATENT DOCUMENTS

| | | |
|---|---|---|
| JP | S63-114593 U | 7/1988 |
| JP | S63-222952 A | 9/1988 |
| JP | 2005-208998 A | 8/2005 |
| JP | 2006-092482 A | 4/2006 |
| JP | 2006-115364 A | 4/2006 |
| JP | 2009-113659 A | 5/2009 |
| JP | 2009-196528 A | 9/2009 |
| JP | 2011-201406 A | 10/2011 |
| JP | 2012-146316 A | 8/2012 |
| JP | 2013-005021 A | 1/2013 |
| JP | 2013-149080 A | 8/2013 |
| WO | 2008/075407 A1 | 6/2008 |

* cited by examiner

MODIFYING AN AUDIO PANORAMA TO INDICATE THE PRESENCE OF DANGER OR OTHER EVENTS OF INTEREST

CROSS-REFERENCE TO RELATED APPLICATIONS

This application is a continuation of U.S. Patent Application titled "MODIFYING AN AUDIO PANORAMA TO INDICATE THE PRESENCE OF DANGER OR OTHER EVENTS OF INTEREST," filed Oct. 21, 2013, having Ser. No. 14/059,359, issued on May 30, 2017 as U.S. Pat. No. 9,663,031. The subject matter of this related application is hereby incorporated herein by reference.

BACKGROUND

Field of the Embodiments of the Invention

Embodiments of the present invention relate generally to danger avoidance systems and, more specifically, to modifying an audio panorama to indicate the presence of danger or other events of interest.

Description of the Related Art

Conventional danger avoidance systems employ a wide variety of different auditory or visual signaling techniques to notify a user that danger is imminent. For example, a proximity sensor within an automobile may emit a loud beeping noise when the automobile approaches within a certain distance of another object, thereby notifying the driver that a collision is imminent. Alternatively, a heads-up display integrated with the cockpit of an aircraft may visually highlight objects in the vicinity of the aircraft, thereby notifying the pilot that a collision is imminent. The auditory and visual signals generated by such conventional systems generally augment the perception of the user by introducing additional sensory information into the environment of the user. The additional sensory information is meant to alert the user to the presence of danger.

One drawback with the above approach is that introducing additional sensory information into the environment of the user can distract or startle the user. Consequently, the user may become overwhelmed with input and lose focus on the task at hand, which, in turn, may exacerbate an already dangerous situation.

As the foregoing illustrates, more effective techniques for indicating the presence of danger or other events of interest to a user would be useful.

SUMMARY

One embodiment of the present invention sets forth a system configured to indicate the presence of an event of interest to a user. The system includes a computing device configured to sample a first audio panorama associated with the user, identify a direction associated with the event of interest relative to a direction that the user is facing, and, based on the first audio panorama, generate a second audio panorama that is narrower than the first audio panorama and substantially aligned with a direction associated with the event of interest. In addition, the system includes at least one audio output device configured to output the second audio panorama to the user.

One advantage of the disclosed systems and techniques is that the attention of the user may be drawn towards an event of interest without introducing additional sensory information to the user. Thus, the user may be made aware of the event of interest without becoming startled or distracted.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1A:
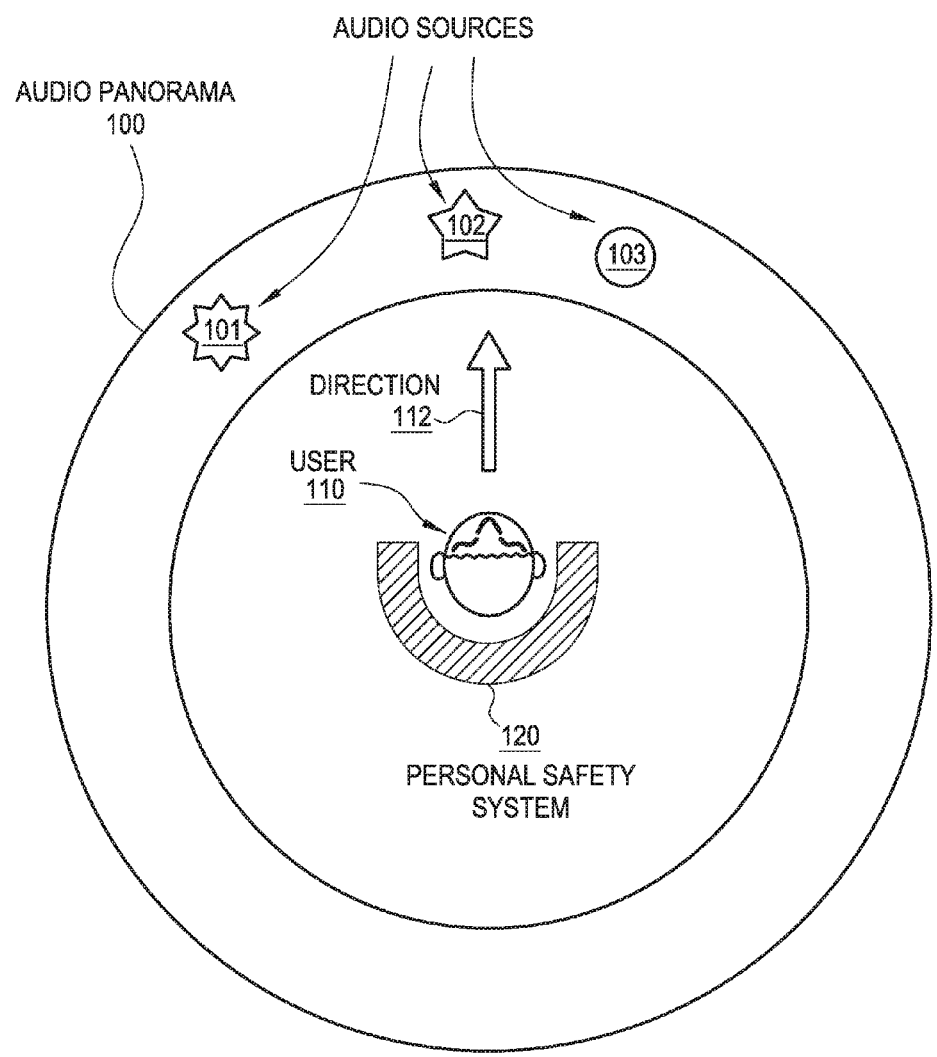
FIGS. 1A-1D are conceptual diagrams illustrating an audio panorama that may be modified to indicate the presence of danger or other events of interest to a user of a personal safety system, according to various embodiments of the present invention.

FIG. 1A is a conceptual diagram illustrating an audio panorama 100 that may be modified to indicate the presence of danger or other events of interest to a user of a personal safety system, according to one embodiment of the present invention. As shown, audio panorama 100 surrounds a user 110 and includes various audio sources, including audio source 101, 102, and 103. User 110 faces in a direction 112, and may thus perceive each of the different audio sources 101, 102, and 103 as originating from a particular direction relative to direction 112. For example, user 110 would perceive audio source 101 as originating from a direction towards the left of user 110. Likewise, user 110 would perceive audio source 102 as originating from a direction in front of user 110 and perceive audio source 103 as originating from a direction towards the right of user 110.

As also shown, user 110 is coupled to a personal safety system 120 that is configured to (i) detect the presence of danger that may pose a threat to user 110, and (ii) draw the auditory perception of user 110 towards the direction of that danger by modifying audio panorama 100. The particular details of personal safety system 120 are not shown here, as personal safety system 120 may be implemented according to several different embodiments that are described in greater detail below in conjunction with FIGS. 2A-2C. As a general matter, though, personal safety system includes various sensors configured to detect the presence of danger or other events of interest to user 110, as well as various audio output devices configured to output sound to user 110 in order to modify audio panorama 100.

Personal safety system 120 may implement several different techniques for drawing the auditory perception of user 100 towards the direction of danger. Personal safety system 120 may cancel or nullify all audio sources that do not originate from the direction of danger, as described in greater detail below in conjunction with FIG. 1B. Personal safety system 120 may also collapse audio panorama 100 so that user 110 perceives some or all audio sources within that panorama as originating from the direction of danger, as described in greater detail below in conjunction with FIG. 1C. Personal safety system 120 may also compress audio panorama 100 so that user 110 perceives the audio sources within the panorama as originating from the direction of danger, while maintaining the relative positioning of those sources within the original panorama, as described in greater detail below in conjunction with FIG. 1D.

Figure 1B:
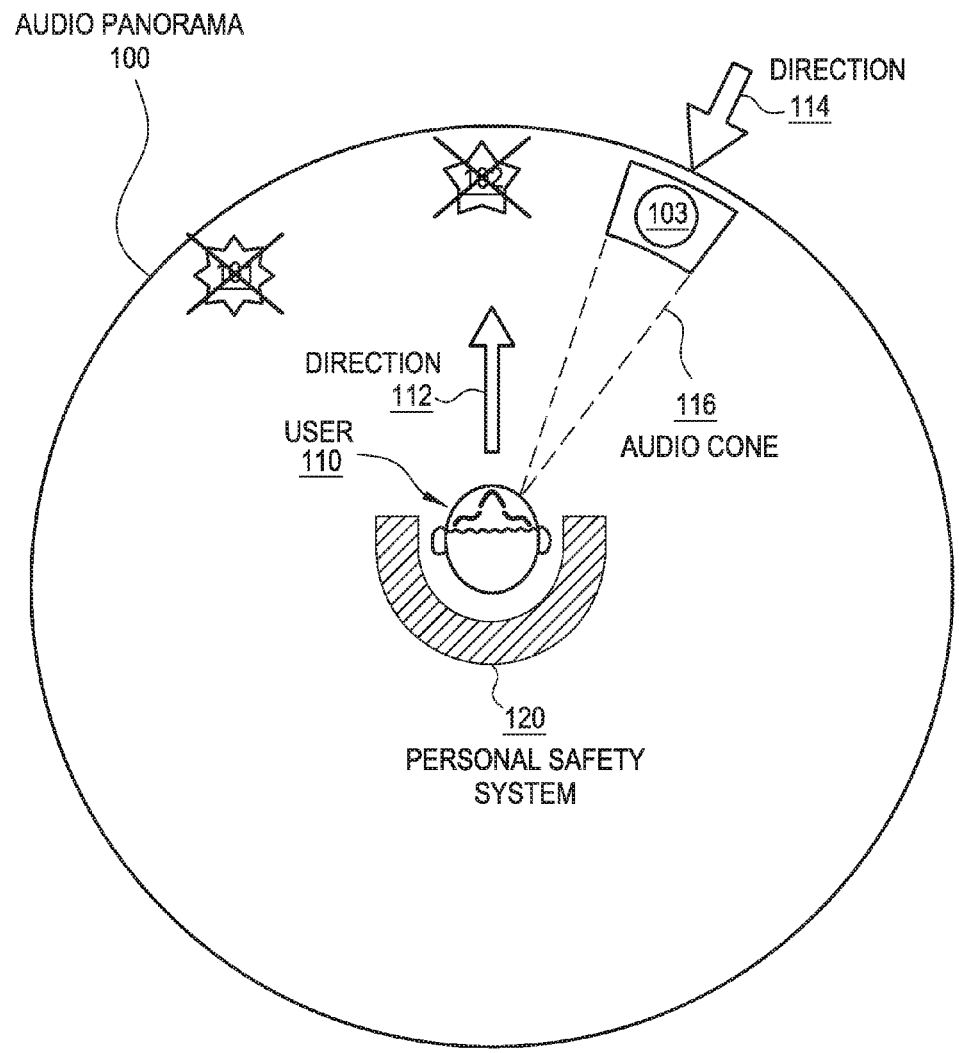

FIG. 1B is a conceptual diagram illustrating audio panorama 100 of FIG. 1 that is reduced to an audio cone 116 to indicate the presence of danger 114, according to one embodiment of the present invention. As shown, danger 114 approaches user 110 from a direction to the right of user 110. User 110 faces in direction 112 and may not immediately notice that danger 112 is imminent. Personal safety system 120, however, is configured to detect danger 114 and, in response, modify sound panorama 110 to assume the shape of cone 116, thereby drawing the auditory perception of user 110 towards danger 114.

In particular, personal safety system 120 cancels all audio sources in the original audio panorama 100 that reside outside of audio cone 116, and permits any audio sources that reside within audio cone 116. In FIG. 1B, personal safety system 120 cancels audio sources 101 and 102, as those sources reside outside of audio cone 116, and permits audio source 103 to remain, as that source resides within audio cone 116. Personal safety system 120 may implement any technically feasible approach to noise cancellation when canceling audio sources 101 and 102. In one embodiment, user safety system 120 may also amplify sounds within audio cone 116, such as e.g. audio source 103.

By reshaping audio panorama 100 in this fashion, personal safety system 120 may draw the auditory perception of user 110 towards audio source 103, and, thus, towards danger 114. In response, user 110 may turn to face danger 114 and become visually aware that danger 114 is imminent.

Another approach to modifying audio panorama 100 is described below in conjunction with FIG. 1C.

Figure 1C:
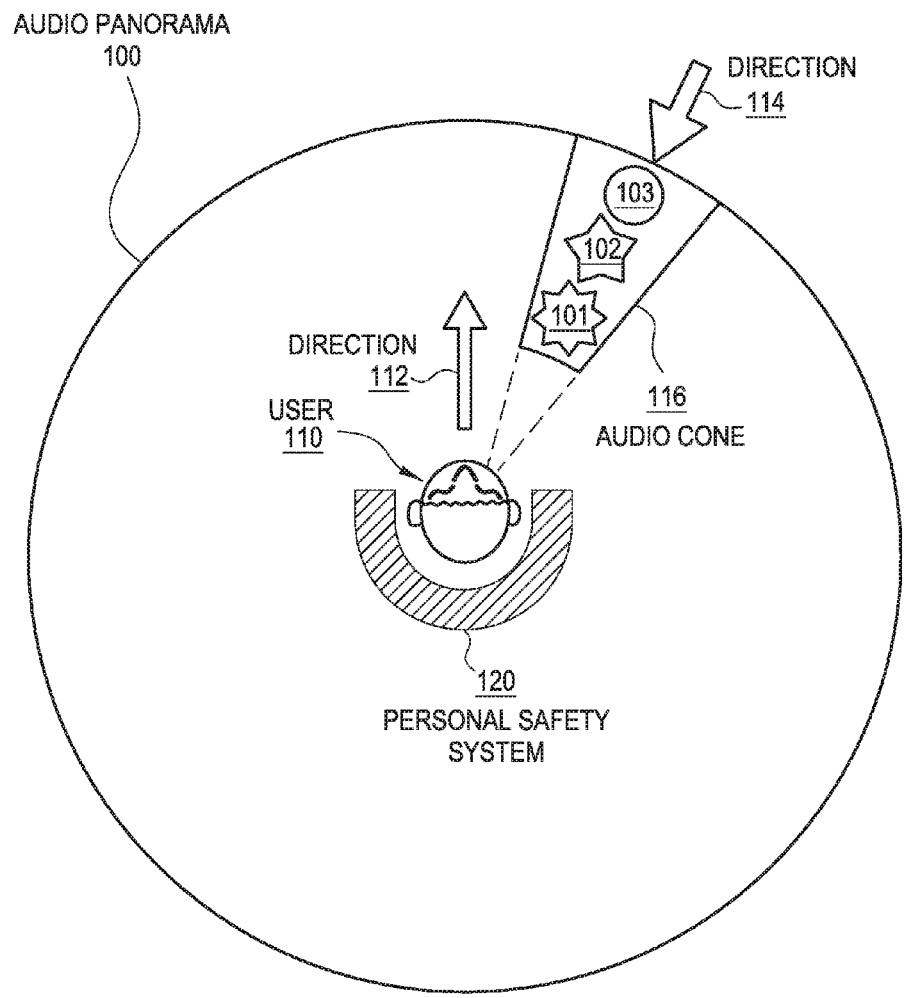

FIG. 1C is a conceptual diagram illustrating audio panorama 100 of FIG. 1 that is collapsed down to audio cone 116 to indicate the presence of danger 114, according to one embodiment of the present invention. As shown, danger 114 approaches user 110 from a direction to the right of user 110, and user 110 faces in direction 112, similar to FIG. 1B. Personal safety system 120 is configured to detect danger 114 and, in response, collapse audio panorama 100 down to audio cone 116.

In particular, personal safety system 120 cancels all audio sources in the original audio panorama 100, and relocates those sources to reside at a single position or angle within audio cone 116. In FIG. 1C, personal safety system 120 relocates audio sources 101, 102, and 103 to reside along a single angle within audio cone 116. In doing so, personal safety system 120 may cancel audio sources 101, 102, and 103, and then replicate those sources so that user 110 perceives sound associated with each source as originating from the same direction within audio cone 116. The canceled audio sources are not shown here for the sake of simplicity.

To implement such functionality, personal safety system 120 may record audio sources 101, 102, and 103, cancel those sources via a noise cancellation technique, render the recorded sources via a two-dimensional (2D) or three-dimensional (3D) positional audio technique, and then output those modulated sources to user 110. In one embodiment, personal safety system 120 collapses audio sources 101, 102, and 103 down to a single mono-aural audio source that user 110 may perceive as originating from a single position within audio cone 116.

By collapsing audio panorama 110 in the fashion described herein, personal safety system 120 may draw the auditory perception of user 110 towards audio sources 101, 102, and 103 within audio cone 116, and, thus, towards danger 114, in similar fashion as described above in conjunction with FIG. 1B. In response, user 110 may turn to face danger 114 and become visually aware that danger 114 is imminent. Another approach to modifying audio panorama 100 is described below in conjunction with FIG. 1D.

Figure 1D:
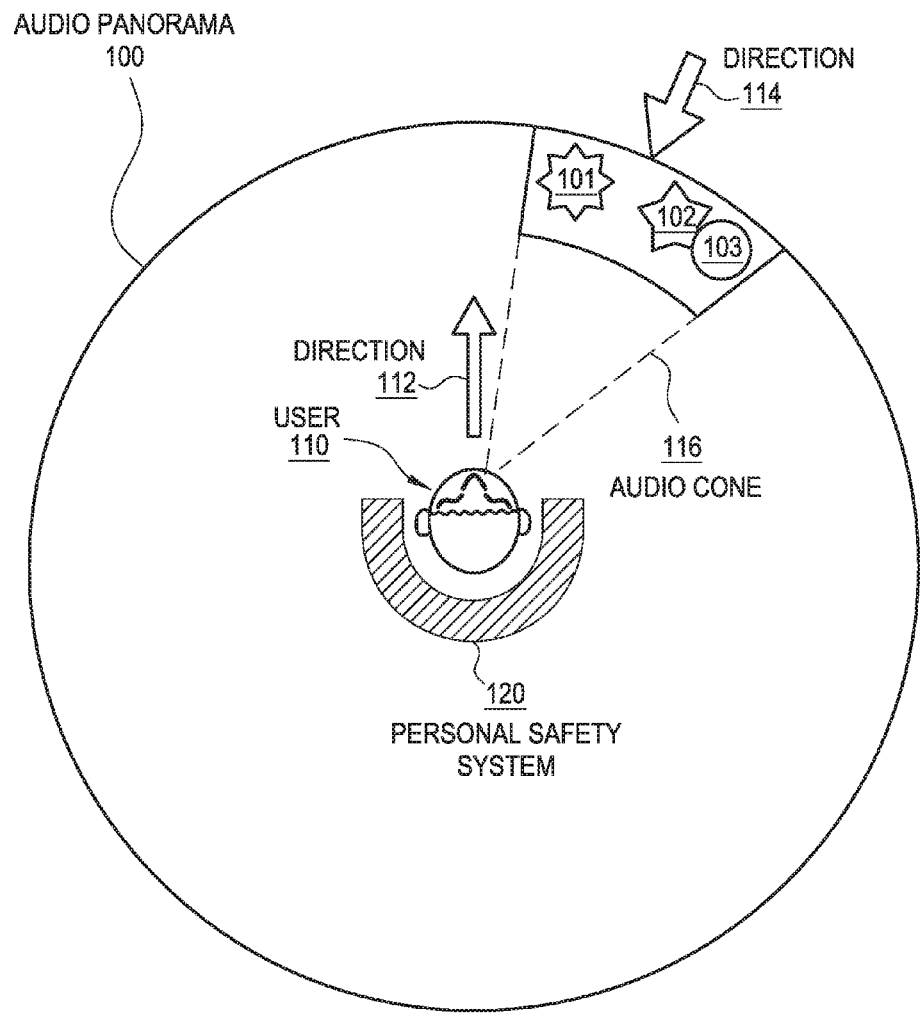

FIG. 1D is a conceptual diagram illustrating audio panorama 100 of FIG. 1 that is spatially compressed down to audio cone 116 to indicate the presence of danger 114, according to one embodiment of the present invention. As shown, danger 114 approaches user 110 from a direction to the right of user 110, and user 110 faces in direction 112, similar to FIGS. 1B-1C. Personal safety system 120 is configured to detect danger 114 and, in response, compress audio panorama 100 to reside entirely within audio cone 116, while maintaining the relative angular positioning of audio sources 101, 102, and 103.

In particular, personal safety system 120 cancels all audio sources in the original audio panorama 100, and then maps those audio sources to new locations within audio cone 116 that are angularly spaced relative to one another in proportion to the original spacing of those sources. In FIG. 1D, personal safety system 120 relocates sources 101, 102, and 103, to new positions within audio cone 116 that are separated from one another by distances or angles that are derived from the original distances or angles between those sources. For example, personal safety system 120 relocates audio sources 102 and 103 to positions that are relatively close to one another, similar to the original positions of those sources within audio panorama 100.

To implement such functionality, personal safety system 120 may record sources 101, 102, and 103, and then cancel those sources via a noise cancellation technique, in similar fashion as described above in conjunction with FIGS. 1B-1C. Personal safety system 120 may then compress audio panorama 100 down to audio cone 116 by computing new positions for audio sources 101, 102, and 103 and then rendering the recorded sources via a 2D positional or 3D positional audio technique so that those sources seem to originate from those new positions. Personal safety system 120 may then output the modulated sources to user 110. User 110 may then perceive the totality of audio panorama 100 as originating from within audio cone 116. Several techniques for accomplishing the "compressing" functionality discussed briefly herein are also described in greater detail below in conjunction with FIGS. 3A-4C.

By compressing audio panorama 100 in the fashion described herein, personal safety system 120 may draw the auditory perception of user 110 towards sources 101, 102, and 103 within audio cone 116, and, thus, towards danger 114. In response, user 110 may turn to face danger 114 and become visually aware that danger 114 is imminent.

Referring generally to FIGS. 1A-1D, persons skilled in the art will recognize that personal safety system 120 may rely on a wide variety of different techniques to implement the functionality described above. For example, personal safety system 120 could detect the presence of danger 114 via any approach to processing sensor input data, including audio/visual data processing, computer vision techniques, environmental data heuristics, and so forth. In addition, personal safety system 120 could cancel audio sources within audio panorama 100 via any technically feasible approach to noise cancellation, including constructive interference or other forms of anti-noise. Further, personal safety system 120 could modify sound panorama 100 to amplify sound associated with danger 114 itself, or focus other sounds within that panorama towards a direction associated with an imminent danger that is silent. As a general matter, modifying audio panorama 100, personal safety system 120 may position audio cone 116 relative to direction 112. In one embodiment, personal safety system 120 includes sensors configured to detect the direction that user 110 is facing or eye-gaze sensors configured to detect the direction that user 110 is looking.

By implementing the disclosed functionality, personal safety system 120 is capable of drawing the attention of user 110 towards danger 114 without introducing additional sensory information. Thus, personal safety system 110 may avoid startling or distracting user 110. In addition, the approach described herein may align closely with the existing intuition of user 110 because user 110 may naturally turn to face a direction of changing auditory perception (i.e., cone 116 shown in FIGS. 1B-1D). Since that auditory perception does not include distracting, artificial sounds, user 110 may turn to face danger 114 unconsciously, and therefore retain sufficient cognitive resources to properly respond to that danger.

Personal safety system 120 may be implemented according to a wide variety of different embodiments. As a general matter, though, personal safety system 120 includes one or more sensors, one or more audio output devices, and at least one processing device. These different devices are configured to interoperate with one another in order to perform the functionality described thus far. An exemplary implementation of personal safety system 120 is described in greater detail below in conjunction with FIG. 7. Personal safety system 120 may also be implemented within a wide variety of different contexts. For example, personal safety system 120 may be incorporated into an automobile, a wearable computing device, a portable computing device, a hearing augmentation device, and so forth. Several exemplary contexts within which personal safety device 120 may be implemented are described in greater detail below in conjunction with FIGS. 2A-2C.

Figure 2A:
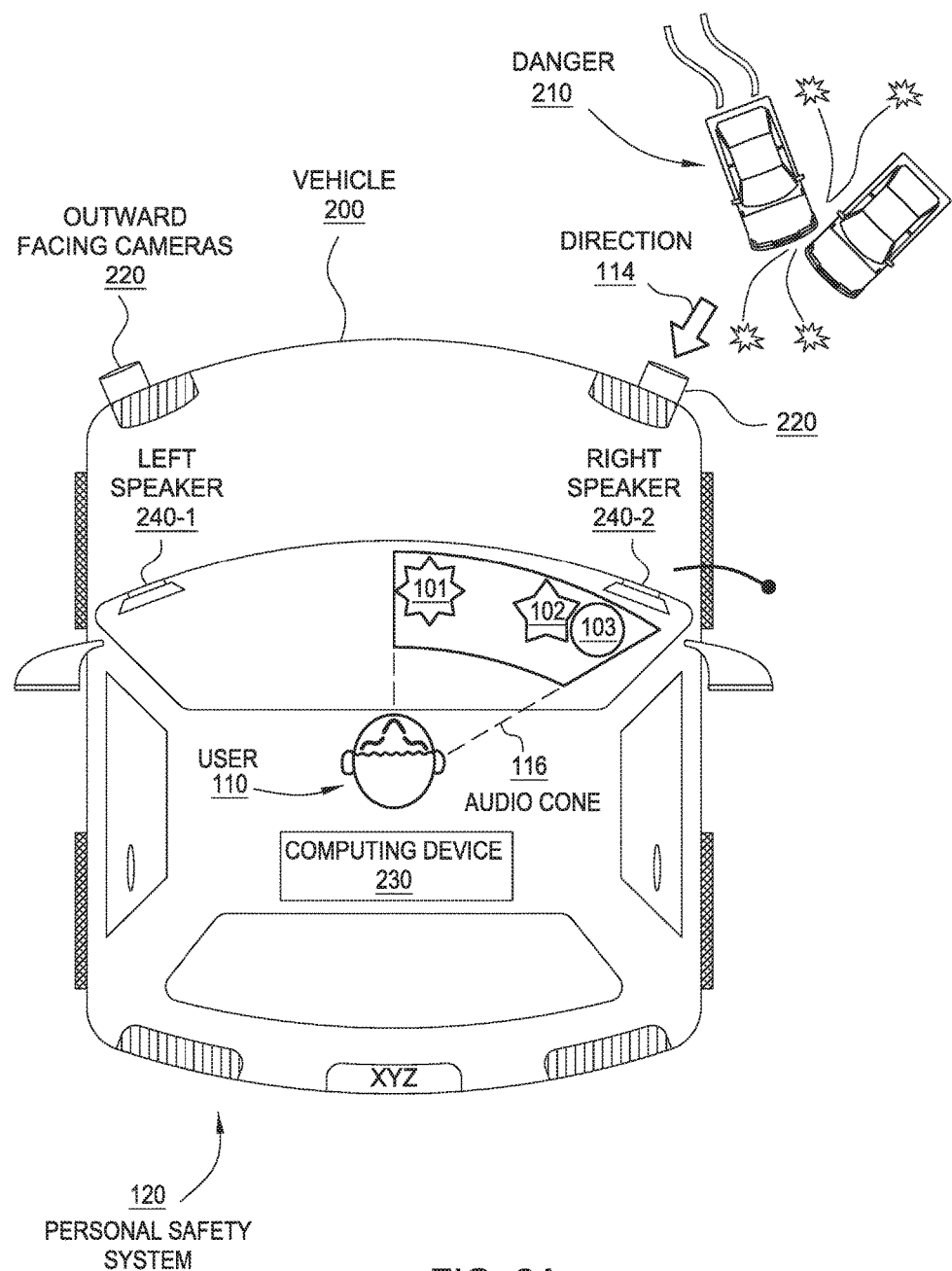
FIGS. 2A-2C are block diagrams illustrating the personal safety system of FIGS. 1A-1D in greater detail, according to various embodiments of the present invention.

FIG. 2A is a block diagram illustrating personal safety system 120 integrated into a vehicle 200, according to one embodiment of the present invention. As shown, a danger 210 approaches vehicle 200, within which user 110 resides, from direction 114. Vehicle 200 includes several elements of personal safety system 120, including outward facing cameras 220, a computing device 230, a left speaker 240-1 and a right speaker 240-2.

Outward facing cameras 220 may be mounted on the interior or exterior of vehicle 200 and are generally positioned to capture video associated with the environment that surrounds vehicle 200. Computing device 230 may be any technically feasible device capable of processing data. An exemplary computing device 230 is described in greater detail below in conjunction with FIG. 7. Speakers 240 may include conventional speakers found in a typical automobile, speakers embedded into a headrest, or other types of speakers. Speakers 240 may also include one or more audio output devices dedicated to noise cancelation, while also including one or more other audio devices dedicated to sound generation.

Outward facing cameras 220 are configured to capture video data that may reflect danger 210. Computing device 230 is configured to process the video data captured by outward facing cameras 220 and to detect danger 210. In response to danger 210, computing device 230 causes speakers 240 to modify an audio panorama associated with user 110 to produce audio cone 116, in similar fashion as described above in conjunction with FIGS. 1A-1D. Audio cone 116 may draw the attention of user 110 towards that danger. Computing device 230 may implement any of the techniques described thus far for modifying the audio panorama output to user 110 to generate audio cone 116. In doing so, computing device 230 may implement selective noise cancellation (i.e. via speakers 240) in order to cancel or otherwise modify the audio panorama associated with user 110 to generate audio cone 116.

In performing the aforementioned functionality, personal safety system 120 is configured to replicate, within vehicle 200, an external audio panorama associated with the environment surrounding the vehicle. Then, when danger 210 is detected, personal safety system 120 may modify that replicated panorama to assume the shape of audio cone 116 shown in FIG. 2A. Personal safety system 120 is configured to modulate the proportion of left and right audio channels that are transmitted to left and right speakers 240 in order to generate audio cone 116, as also described in greater detail below in conjunction with FIGS. 3A-3C. Another implementation of personal safety system 120 is described below in conjunction with FIG. 2B.

Figure 2B:
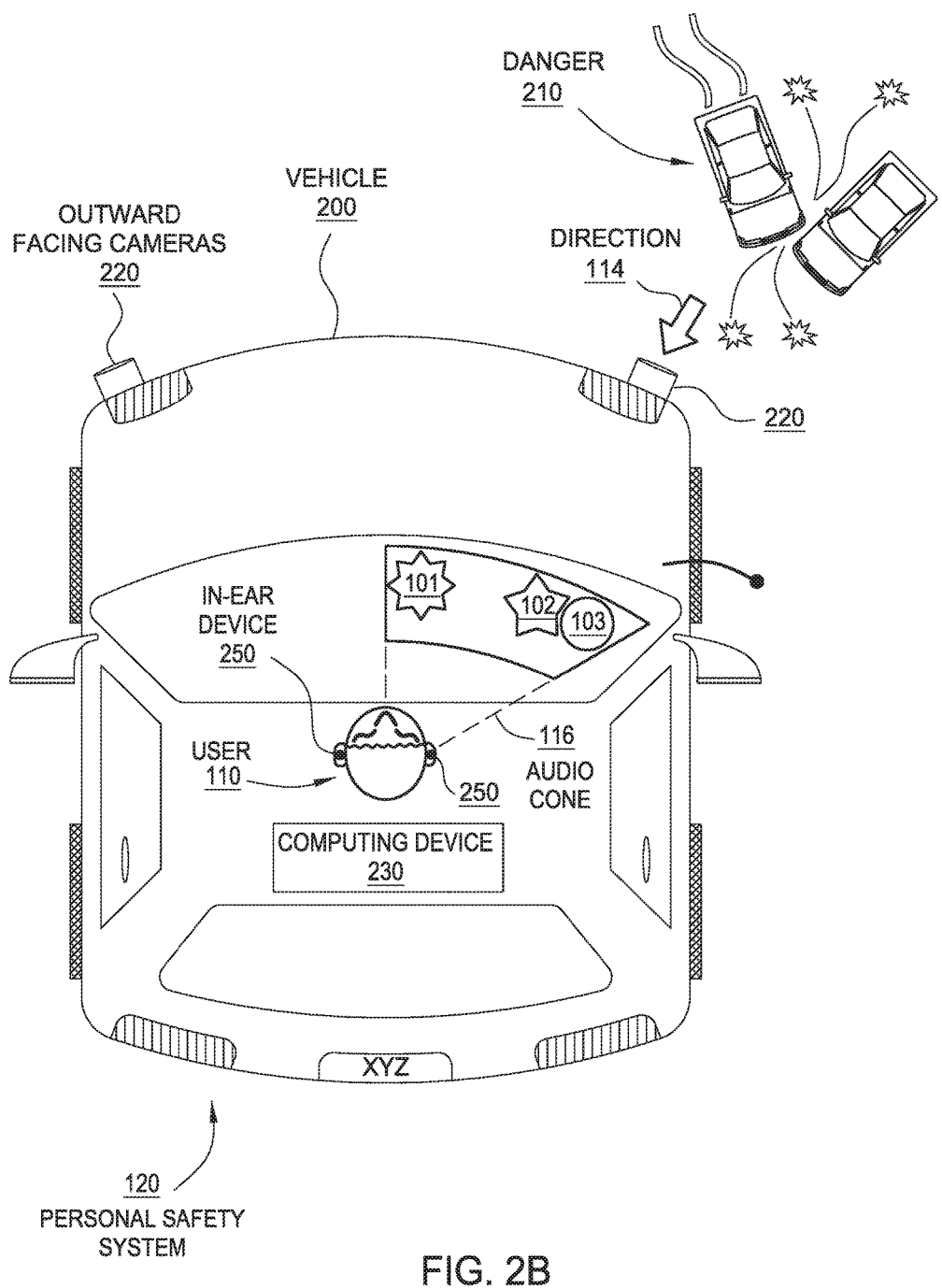

FIG. 2B is a block diagram that illustrates personal safety system 120 integrated into a vehicle, according to another embodiment of the present invention. As shown, danger 210 approaches vehicle 200, within which user 110 resides, from direction 114, similar to FIG. 2A. Vehicle 200 includes several elements of personal safety system 120, including outward facing cameras 220, computing device 230, and an in-ear device 250. In-ear device 250 could be a hearing aid or another form of audio device configured to transmit audio directly into the ear of user 110.

Outward facing cameras 220 are configured to capture video data that may reflect danger 210, and computing device 230 is configured to process that video data to detect danger 210, as described above in conjunction with FIG. 2A. In response to danger 210, computing device 230 causes in-ear devices 250 to modify an audio panorama associated with user 110 to produce audio cone 116, in similar fashion as described above in conjunction with FIGS. 1A-1D. Audio cone 116 may draw the attention of user 110 towards that danger. Computing device 230 may implement any of the techniques described thus far for modifying the audio panorama output to user 110 to generate audio cone 116. Another implementation of personal safety system 120 is described below in conjunction with FIG. 2C.

Figure 2C:
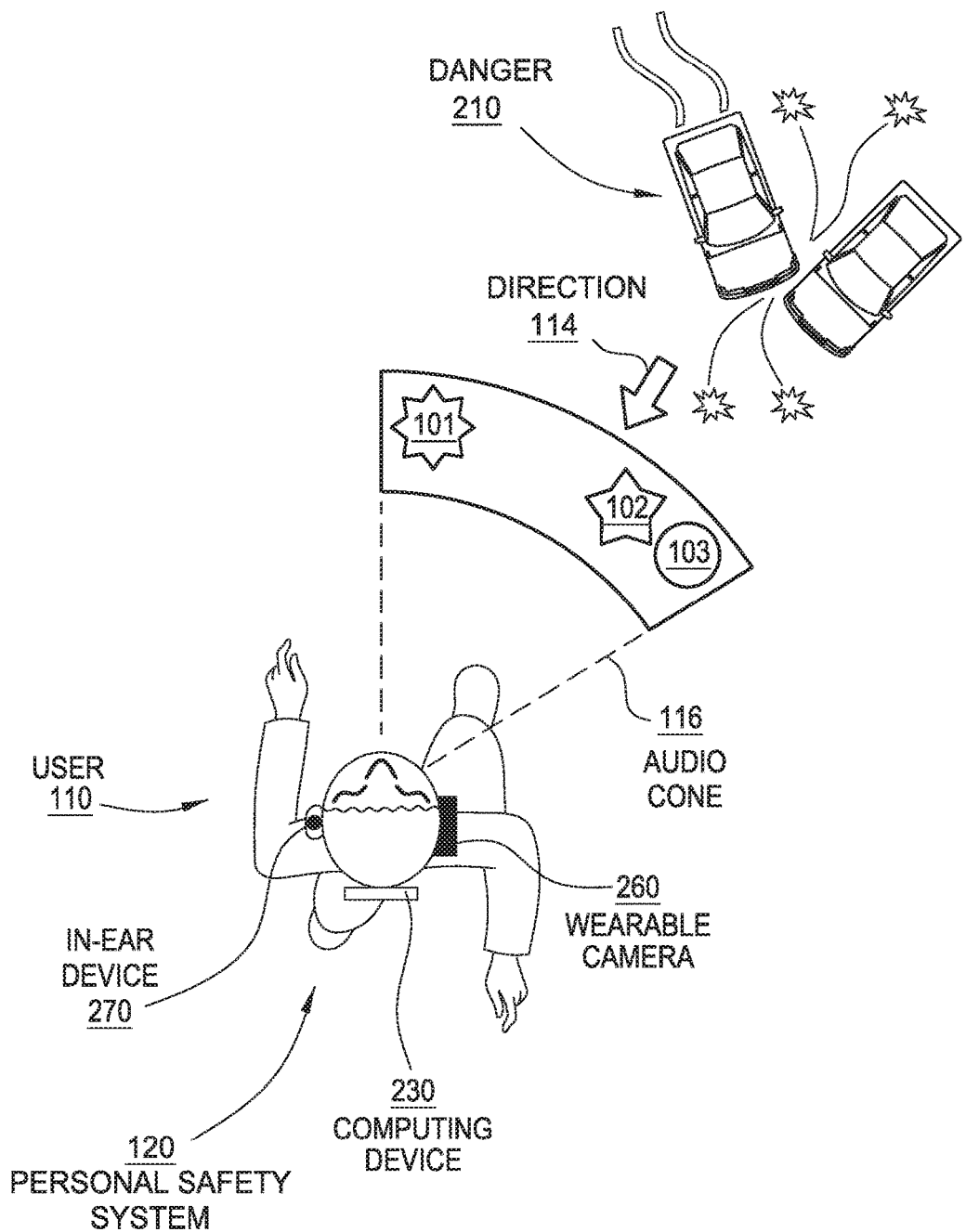

FIG. 2C is a block diagram that illustrates personal safety system 120 integrated into a wearable system, according to one embodiment of the present invention. As shown, danger 210 approaches user 110 from direction 114, similar to FIGS. 2A-2B. User 110 wears personal safety system 120, which includes computing device 230, a wearable camera 260, and an in-ear device 270.

In-ear device 270 may be a hearing aid or another form of audio device configured to transmit audio directly into the ear of user 110. Wearable camera 260 may be integrated into a user accessory such as, for example and with limitation, a set of glasses, a hat, an earpiece worn by user 110, or jewelry worn by user 110, such as, e.g., an amulet. Computing device 230 may be circuitry that is integrated into a set of glasses or other user accessories, or a cell phone or tablet computer carried by user 110.

Wearable camera 260 is configured to capture video data that may reflect danger 210, and computing device 230 is configured to process that video data to detect danger 210. In response to danger 210, computing device 230 causes in-ear device 270 to modify an audio panorama associated with user 110 to produce audio cone 116, in similar fashion as described above in conjunction with FIGS. 1A-1D. Audio cone 116 may draw the attention of user 110 towards that danger. Computing device 230 may implement any of the techniques described thus far for modifying the audio panorama output to user 110 to generate audio cone 116. Those techniques are described in greater detail below in conjunction with FIGS. 3A-4C.

Figure 3A:
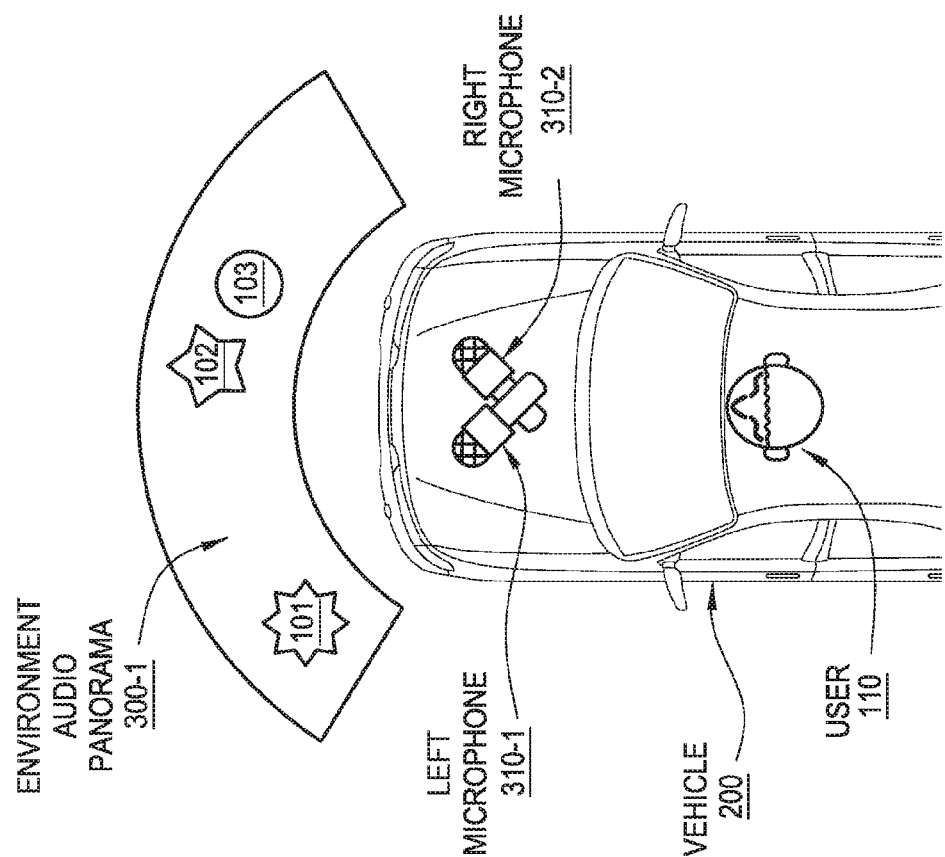
FIG. 3A-3D are conceptual diagrams illustrating a technique for modulating audio channels to replicate an external audio panorama within a vehicle, according to various embodiments of the present invention.

FIG. 3A is a conceptual diagram illustrating an environment audio panorama 300-1 that resides external to vehicle 200, according to one embodiment of the present invention. As shown, vehicle 200 includes a left microphone 310-1 and a right microphone 310-2 that are configured to detect environment audio panorama 300-1. Microphones 310 may be integrated into personal safety system 120. Environment audio panorama 300-1 includes sources 101, 102, and 103.

As a general matter, embodiments of the present invention may rely on any form of external transducer, such as microphones 310, to capture the complete external sound field, including natural audio sources such as animals, other cars, etc. A common way to pick up an external sound field is to use two directional microphones (as shown in FIG. 3A), which are located close to each other, but pointing in different directions. The angle between the two microphones may be between 90 degrees and 120 degrees. Microphone 310-1 provides a signal that is sent to a left channel, and microphone 310-2 provides a signal that is sent to the right channel. Audio associated with those channels may then be output to user 110 via speakers 240 in order to replicate environment audio panorama 300-1, as described in grater detail below in conjunction with FIG. 3B.

Figure 3B:
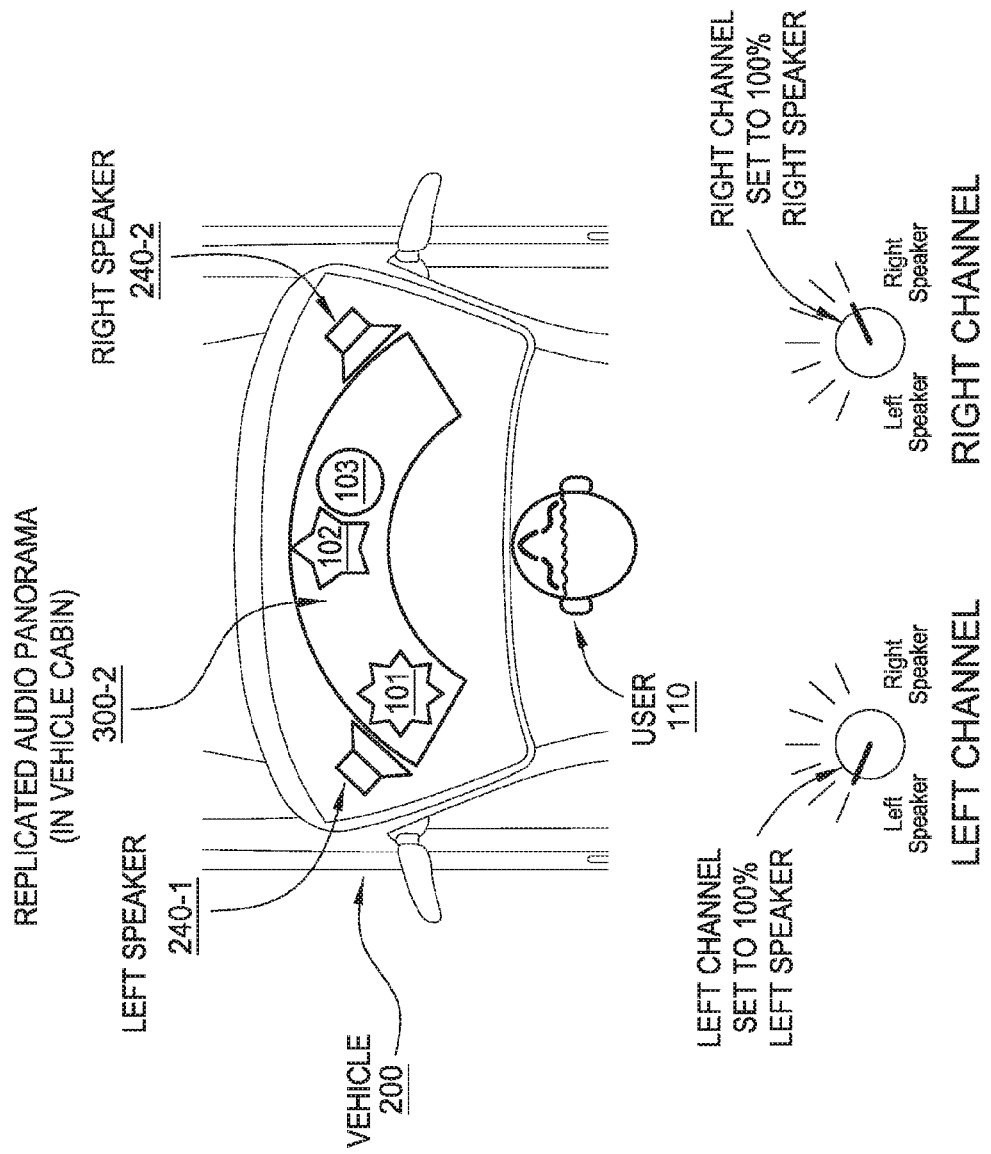

FIG. 3B is a conceptual diagram illustrating a replicated audio panorama 300-2 that is produced within vehicle 200. Left speaker 240-1 and right speaker 240-2 are configured to replicate sources 101, 102, and 103 within vehicle 200 so that user 110 perceives audio panorama 300-2 within vehicle 200. Audio panorama 300-2 may appear to be similar to environment audio panorama 300-1. In other words, personal safety system 120 is configured to act as a "pass-through" device so that external sounds may pass from the exterior of vehicle 200 into the interior of vehicle 200 and, there, be perceived by user 110.

To achieve the functionality described above, left microphone 310-1 is configured to sample sound associated with a left side of environment audio panorama 300-1 and to assign the sampled sound to a left channel. Similarly, right microphone 310-2 is configured to sample sound associated with a right side of environment audio panorama 300-1 and to assign the sampled sound to a right channel. Left speaker 240-1 then outputs 100% of left channel, while right speaker 240-2 outputs 100% of right channel, thereby replicating environment audio panorama 300-1 as a whole, as sampled by microphones 310.

Persons skilled in the art will recognize that sound systems in general may have left and right sound channels, where a left-side speaker outputs the left channel, and a right-side speaker outputs the right channel, similar to the configuration described above. However, personal safety system 120 is also configured to modify the degree to which each channel is output to the different speakers in order to narrow the replicated sound panorama 300-2. In doing so, personal safety system 120, causes speakers 240 to output various ratios of the left and right channels, as described below in conjunction with FIG. 3C.

Figure 3C:
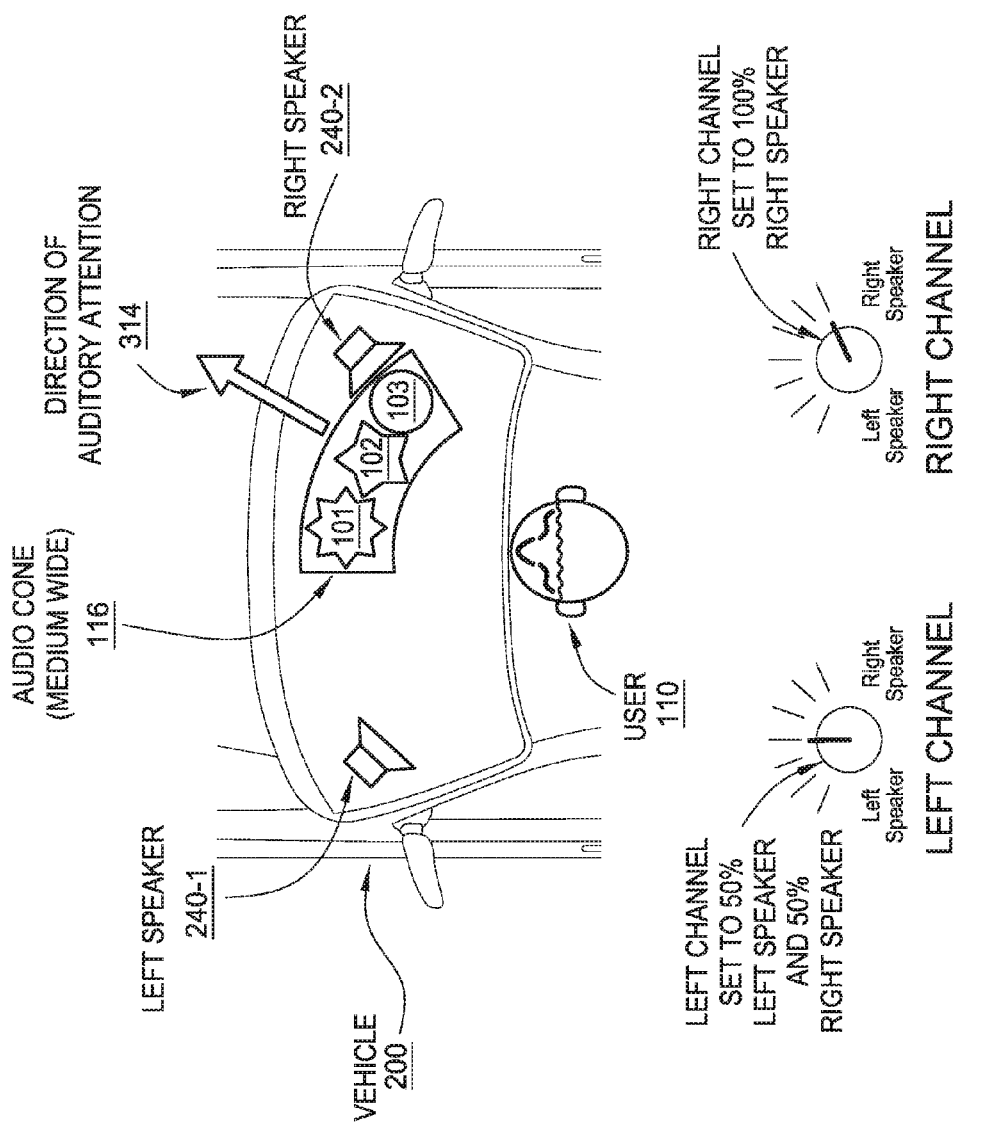

FIG. 3C is a conceptual diagram illustrating the replicated audio panorama 300-2 of FIG. 3B compressed down to audio cone 116, according to one embodiment of the present invention. As shown, audio cone 116 is aligned with a direction of auditory attention 314. In practice, personal safety system 120 generates audio cone 116 to indicate a direction associated with imminent danger, thereby informing user 110 that such danger exists. In doing so, personal safety system 120 is configured to reposition audio sources 101, 102, and 103 in the fashion described in conjunction with FIG. 1D, thereby compressing replicated audio panorama 300-2 in such a way that the relative angular positioning of those audio sources is maintained. One technique to achieve the aforementioned source repositioning while maintaining the relative angular position of the sound sources is to narrow replicated audio panorama 300-1 by manipulating the distribution of the sound channels to the loudspeakers.

To explain the narrowing of a sound panorama by manipulating the distribution of the sound channels to the loudspeakers, consider, as an example, an additive sound system. Such a sound system could generate audio associated with a collection of individual music instruments, where each music instrument represents an individual audio source. All individual audio sources are positioned by a sound mixer along the audio panorama, from left most to right most or anywhere in between, by assigning some portion of each audio source to the left sound channel, and some portion of each audio source to the right sound channel. In particular, in order to cause one audio source to appear to originate from far left, the sound system would route 100% of a signal associated with the audio source to the left channel, and route 0% of that signal to the right channel. In order to cause the audio source to appear to originate from straight ahead, the sound system would route 50% of the signal to the left channel, and route 50% of the signal to the right channel. Since in a common configuration the left channel is sent exclusively to the left loudspeaker, and the right channel is sent exclusively to the right loudspeaker, the latter configuration will create the auditory spatial illusion that the audio source originates from in between the speakers. (The same is true for audio systems with more than two loudspeakers, essentially forming a 2D sound field or surround sound field.)

As described above, in a standard configuration common to most speaker systems, 100% of the left channel is played back on the left loudspeaker, and 100% of the right channel is played back on the right loudspeaker. In order to narrow replicated audio panorama 300-2 down to audio cone 116 while still maintaining the relative angular positioning of all individual audio sources, personal safety system 120 is configured to change the default distribution of the left and right channels to the left and right speakers 240-1 and 240-2, respectively. For example, instead of routing 100% of the left channel to left speaker 240-1, and 100% of the right channel to right speaker 240-2, personal safety system 120 may route 80% of the left channel to left speaker 240-1 and 20% of the left channel to right speaker 240-2, and 80% of the right channel to right speaker 240-2 and 20% of the right channel to left speaker 240-1. In this configuration, replicated audio panorama 300-1 is compressed to audio cone 116, which is narrower than the original panorama.

In another example, personal safety system 120 may route 50% of the left channel to left speaker 240-1 and 50% of the left channel to right speaker 240-2, and 100% of the right channel to right speaker 240-1. In this configuration, replicated audio panorama 300-2 is compressed to half size to become audio cone 116, and at the same time the audio cone 116 is rotated to the right side from the perspective of user 110. This particular case is shown in FIG. 3C.

An alternative technique for source repositioning is as follows: the environment audio panorama 300-1 is sampled by one or more audio transducers, such as, e.g., microphones 310. The sampled audio is then analyzed for individual audio sources, such as a bird chirping, a dog barking, or another car's engine sound. After detecting individual audio sources, digital signal processing (DSP) techniques are used to acoustically isolate each of the audio sources. Once each of the audio sources are isolated to mono-aural sound streams, those sources can be positioned at arbitrary positions in replicated audio panorama 300-2, similar to additive sound mixing as described above. In this configuration, the sound signals from the external transducers are not assigned directly to the left and right channel.

The location of each audio source can mirror the original direction that audio source originates from, e.g., a bird sound that came from front-left, can be positioned in replicated audio panorama 300-2 at the same angular position, front-left. In order to spatially compress the replicated audio panorama 300-2 down to audio cone 116, being narrower than the original panorama, each individual audio source can be placed computationally at any desired location in audio cone 116, including (but not limited to) positions which maintain the relative angular position of each individual audio source. Alternatively, multiple audio sources could be placed on the identical angular position, collapsing replicated audio panorama 300-2 to a single point and reducing the angular difference between all audio sources to zero. In yet another alternative, individual audio sources could be spread out over replicated audio panorama 300-2 for the user, maximizing the angular difference between those audio sources. The latter may be appropriate so that the user can distinguish two individual audio sources better, e.g., two different cars approaching from a similar direction, but not exactly the same direction.

The techniques described above are also applicable to replicating a full 360-degree audio panorama within vehicle 200, as described in greater detail below in conjunction with FIGS. 4A-4C.

Figure 4A:
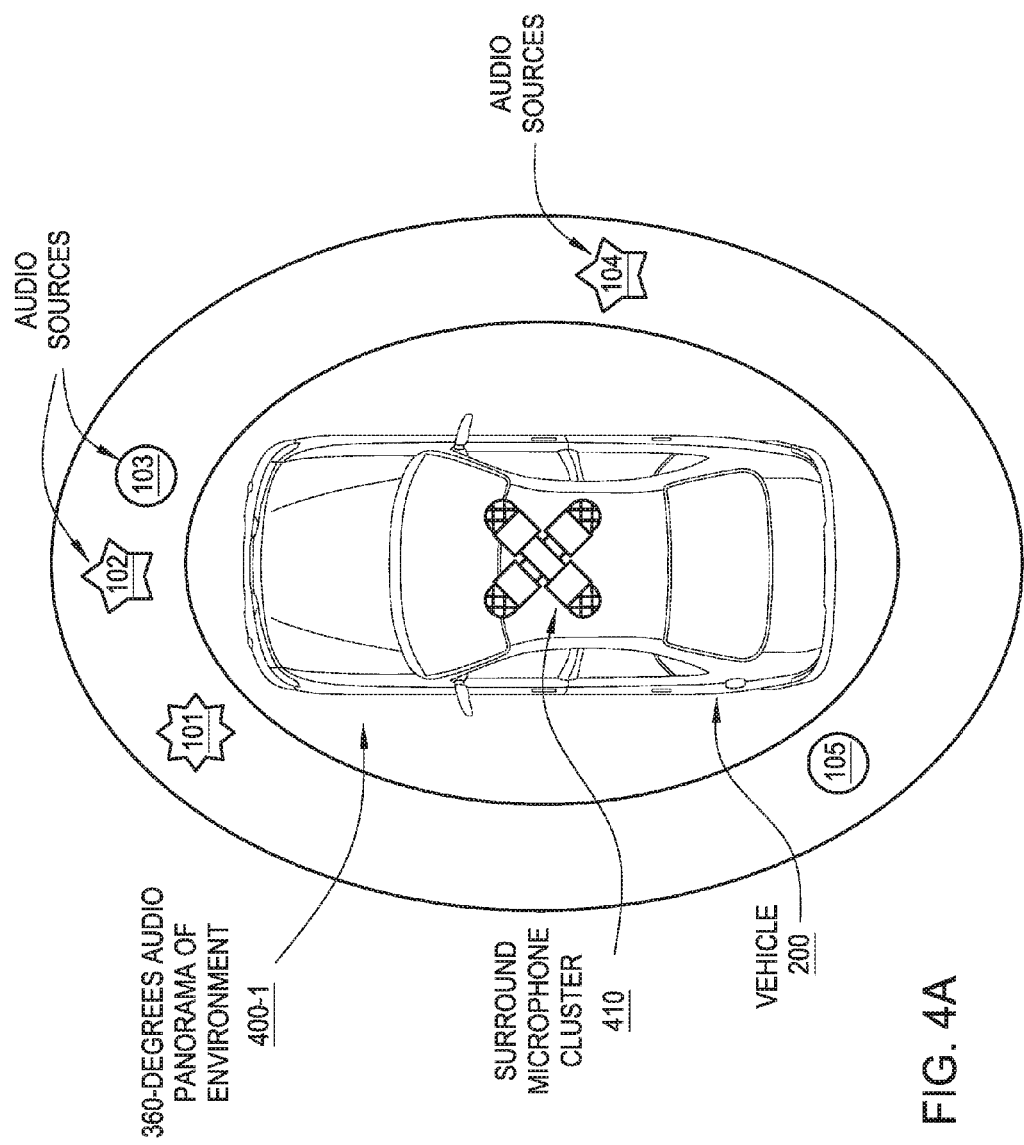
FIG. 4A-4C are conceptual diagrams illustrating a technique for replicating a 360-degree audio panorama within a vehicle, according to various embodiments of the present invention.

FIG. 4A illustrates a 360-degree audio panorama 400-1 that includes sources 101, 102, 103, 104, and 105. Vehicle 200 includes surround microphone cluster 410, which is an element of personal safety system 120. Surround microphone cluster 410 is configured to sample 360-degree audio panorama 400-1 and to replicate that panorama within vehicle 200, as described in greater detail below in conjunction with FIG. 4B.

Figure 3D:
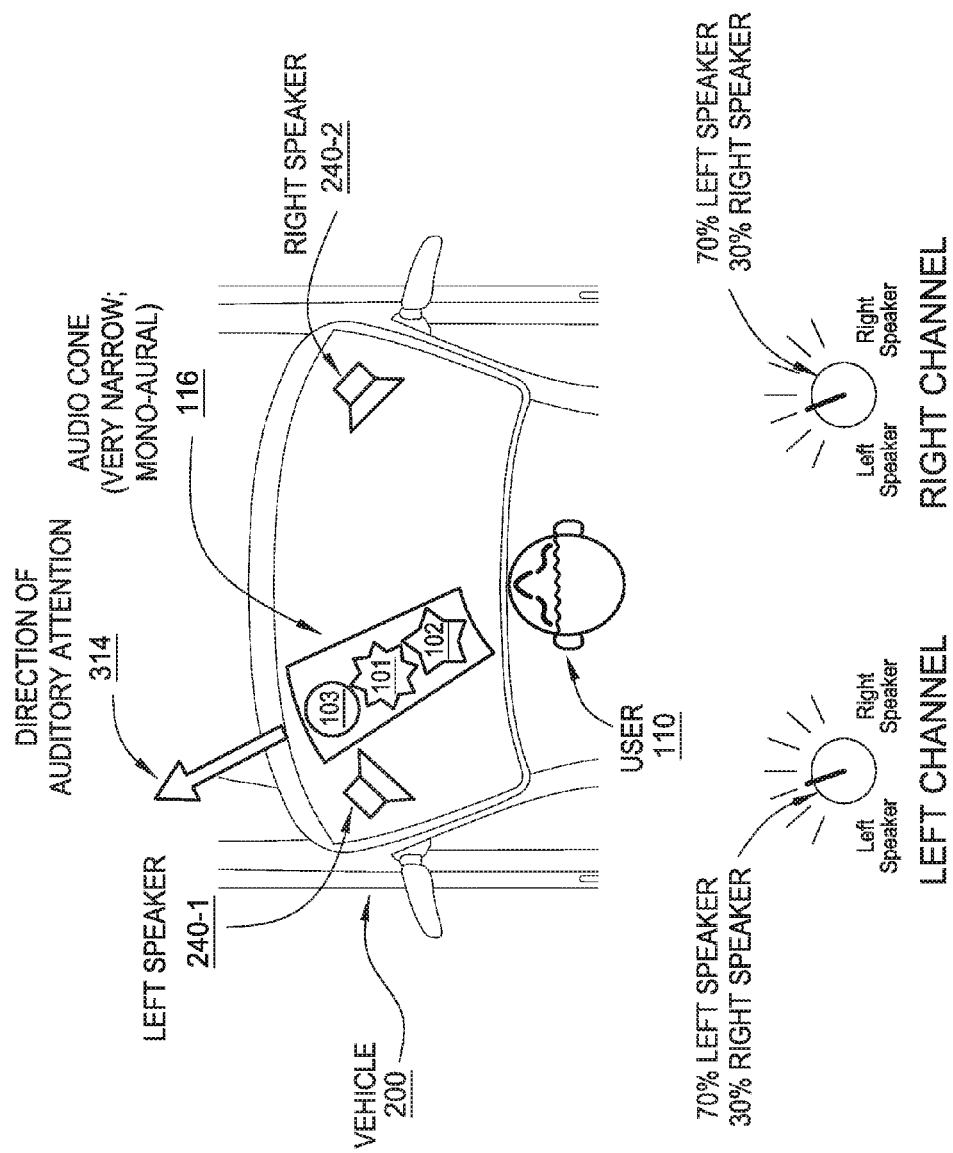
Figure 4B:
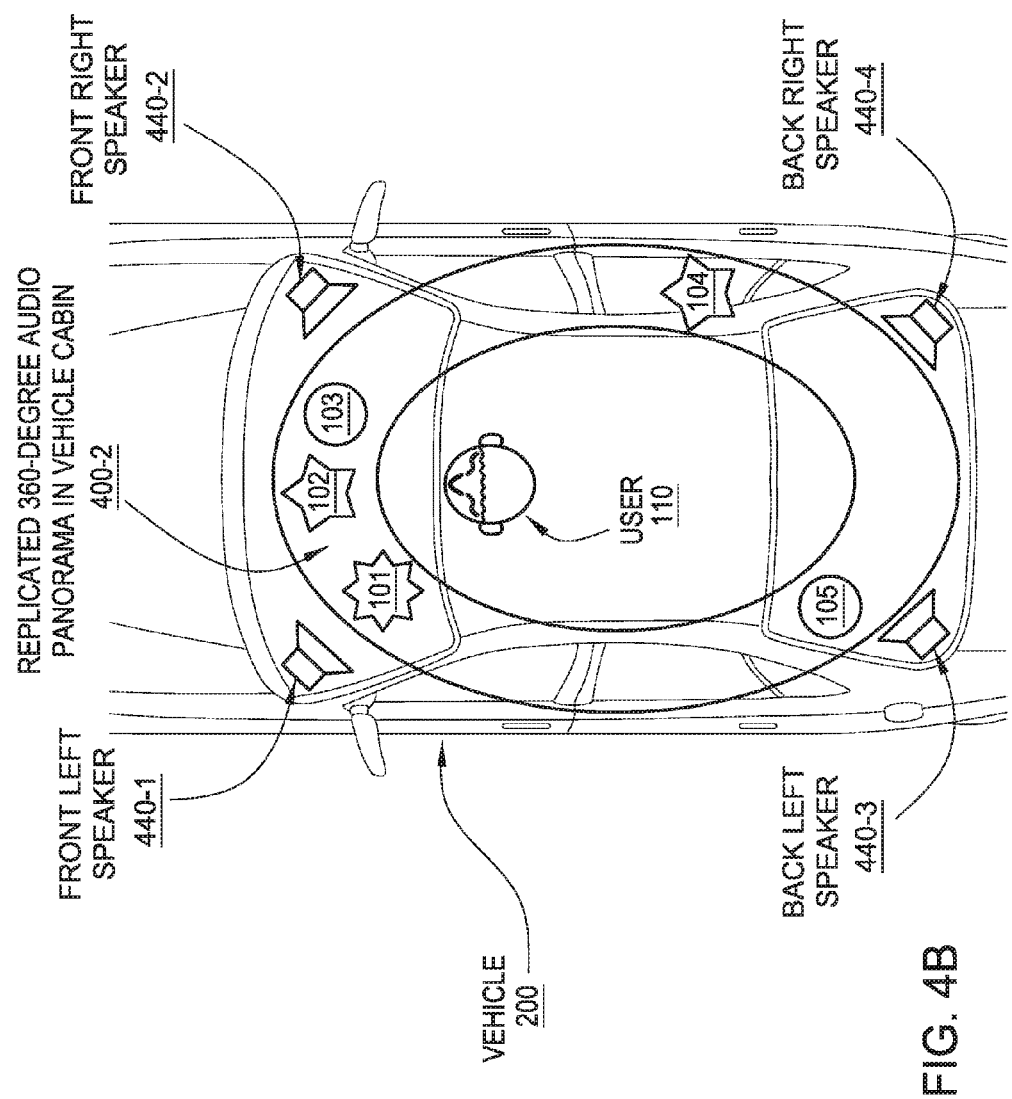

FIG. 4B is a conceptual diagram illustrating a replicated 360-degree audio panorama generated by personal safety system 120 within vehicle 200. As shown, vehicle 200 includes front-left speaker 440-1, front-right speaker 440-2, back-left speaker 440-3, and back-right speaker 440-4. Personal safety system 120 is configured to sample 360-degree audio panorama 400-1 and to then cause speakers 440 to output replicated 360-degree audio panorama 400-2. In doing so, personal safety system may employ similar techniques as described above in conjunction with FIGS. 3A-3D.

Specifically, personal safety system 120 may cause each microphone within microphone cluster 410 to sample audio associated with a different region of 360-degree panorama, and to then assign the audio associated with each such region to a separate channel. Personal safety system 120 then causes a different speaker 440 to output each different channel. Front-left speaker 440-1 would output audio associated with a front-left portion of 360-degree audio panorama 400-1, front-right speaker 440-2 would output audio associated with a front-right portion of 360-degree audio panorama 400-1, back-left speaker 440-3 would output audio associated with a back-left portion of 360-degree audio panorama 400-1, and back-right speaker 440-4 would output audio associated with a back-right portion of 360-degree audio panorama 400-1. Personal safety system 120 is configured to then manipulate the distribution of audio channels to speakers 440, as described in greater detail in conjunction with FIG. 4C.

Figure 4C:
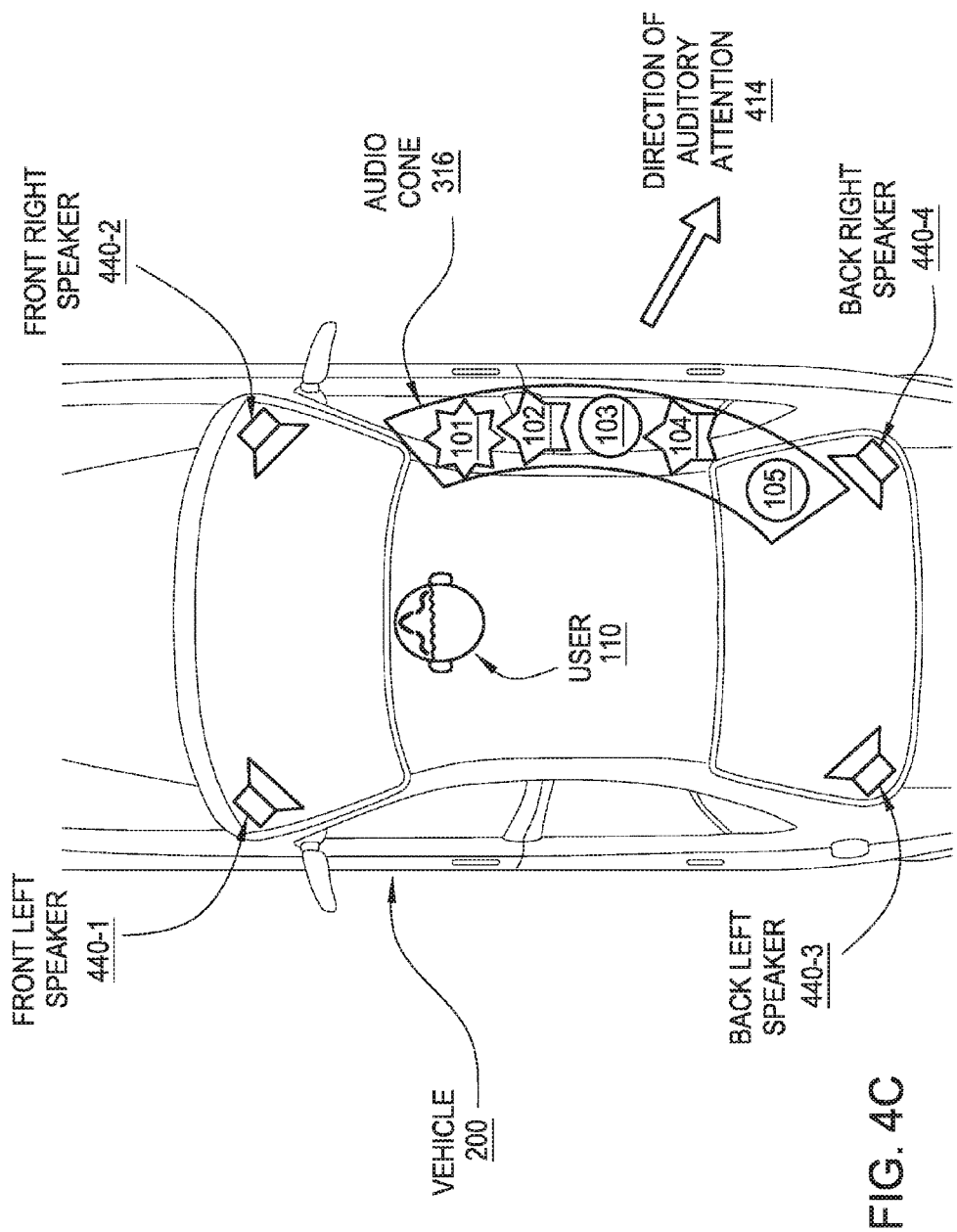

FIG. 4C is a conceptual diagram that illustrates replicated audio panorama 300-2 compressed down to audio cone 316. As shown, audio cone 316 includes audio sources 101, 102, 103, 104, and 105. Personal safety system 120 is configured to position those audio sources to have relative angular positions that are proportional to the original angular positions of those audio sources. Audio cone 416 is aligned with a direction of auditory attention 414, which, in practice, indicates a direction associated with imminent danger. Personal safety system 120 is configured to manipulate the distribution of audio channels associated with microphones within microphone cluster 410 in order to cause audio sources 101, 102, 103, 104, and 105, to appear to originate from the locations within audio cone 416 shown in FIG. 4C. Personal safety system 120 may also assign each source to a separate channel, and then manipulate the distribution of those channels. In doing so, personal safety system generally employs similar techniques as described in conjunction with FIGS. 3A-3D.

Persons skilled in the art will understand that any of the techniques described thus far may be combined with any of the other techniques described herein. For example, the approach for replicating and modifying a 360-audio panorama described in conjunction with FIG. 4C may be implemented in the context of the wearable personal safety device discussed above in conjunction with FIG. 3C. The general technique performed by personal safety system 120 is described, in stepwise fashion, below in conjunction with FIG. 5.

Figure 5:
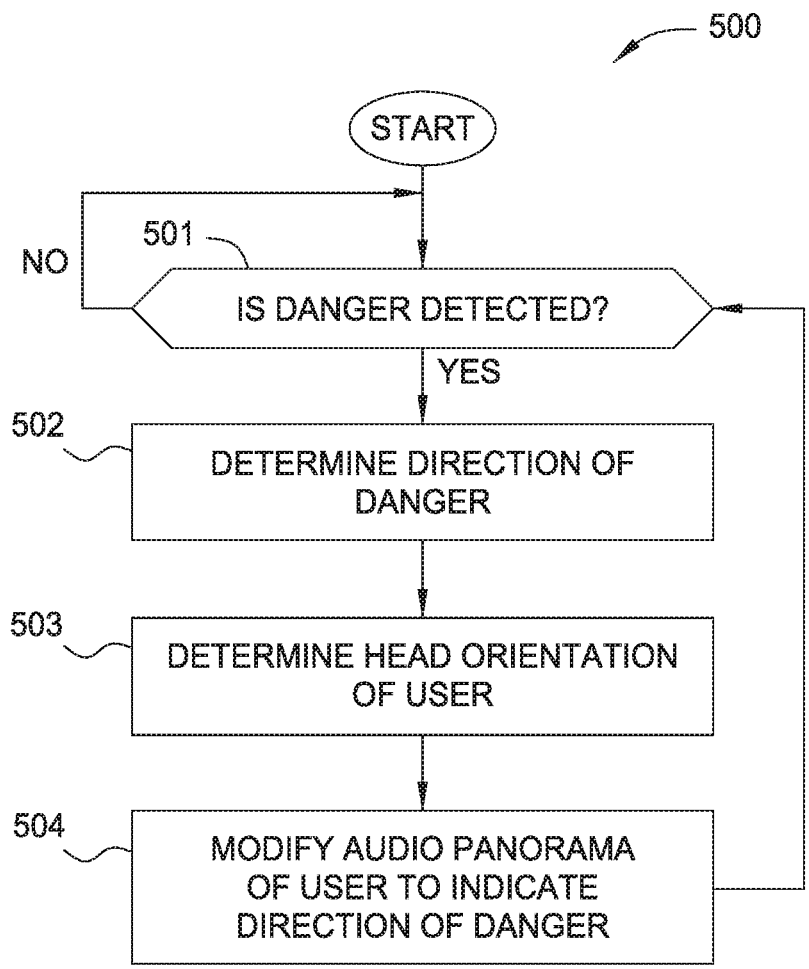
FIG. 5 is a flow diagram of method steps for modifying an audio panorama to indicate the presence of danger or other events of interest to a user of the personal safety system of FIGS. 1-4C, according to various embodiments of the present invention.

FIG. 5 is a flow diagram of method steps for modifying an audio panorama to indicate the presence of danger or other events of interest to a user of a personal safety device, according to one embodiment of the invention. Although the method steps are described in conjunction with the systems of FIGS. 1A-4C, persons skilled in the art will understand that any system configured to perform the method steps, in any order, is within the scope of the present invention.

As shown, a method 500 begins at step 501, where personal safety system 120 determines whether danger has been detected. Personal safety system 120 may be worn by a user, such as, e.g. user 110 shown in FIGS. 1A-4C, or integrated within a vehicle driven by the user, among other possibilities, as discussed in conjunction with FIGS. 2A-2C. In other embodiments, for example and without limitation, personal safety system 120 may be implemented in a home environment to bring a user's attention to a danger or event of interest within the home, such as a baby crying in a particular room or a gas leak or a fire. Personal safety system 120 may repeat step 501 of the method 500 until danger is detected. Personal safety system 120 is configured to detect danger by processing raw sensor data and implementing any of a wide variety of data processing techniques. For example, and without limitation, personal safety system 120 could implement a computer vision-based approach to identifying automobiles that may pose a threat to the user.

Upon detecting danger, such as, e.g. danger 114 shown in FIGS. 1B-1D, personal safety system 120 then determines the direction of the danger at step 502. At step 503, personal safety system 120 also determines the head orientation of the user. Personal safety system 120 could, for example, and without limitation, employ head sensors or eye direction sensors to determine a direction that the user is facing or looking.

At step 504, personal safety system 120 modifies an audio panorama of the user. The audio panorama could be, e.g. audio panorama 100 shown in FIGS. 1A-1D. In doing so, personal safety system 120 may cancel all sources of sound within the audio panorama except those originating from the direction of danger, in similar fashion as described above in conjunction with FIG. 1B. Personal safety system 120 may also cancel all sources of sound within the audio panorama, and then generate acoustic output that represents a collapsed version of the audio panorama, in similar fashion as discussed in conjunction with FIG. 1C. Personal safety system 120 may also cancel all sources of sound within the audio panorama, and then generate acoustic output that represents a compressed version of the audio panorama, in similar fashion as discussed in conjunction with FIG. 1D.

Personal safety system 120 may repeat the method 500 iteratively, as needed, in order to continually refocus the audio panorama onto imminent danger. With the approach described herein, personal safety system 120 is capable of drawing the attention of the user towards danger without introducing additional sensory information. Thus, personal safety system 120 may avoid startling or distracting the user.

When generating acoustic output that represents a compressed version of the audio panorama, as described above in conjunction with FIGS. 1D and 3A-4C, personal safety system 120 may implement a specific technique that is described in stepwise fashion below in conjunction with FIG. 6.

Figure 6:
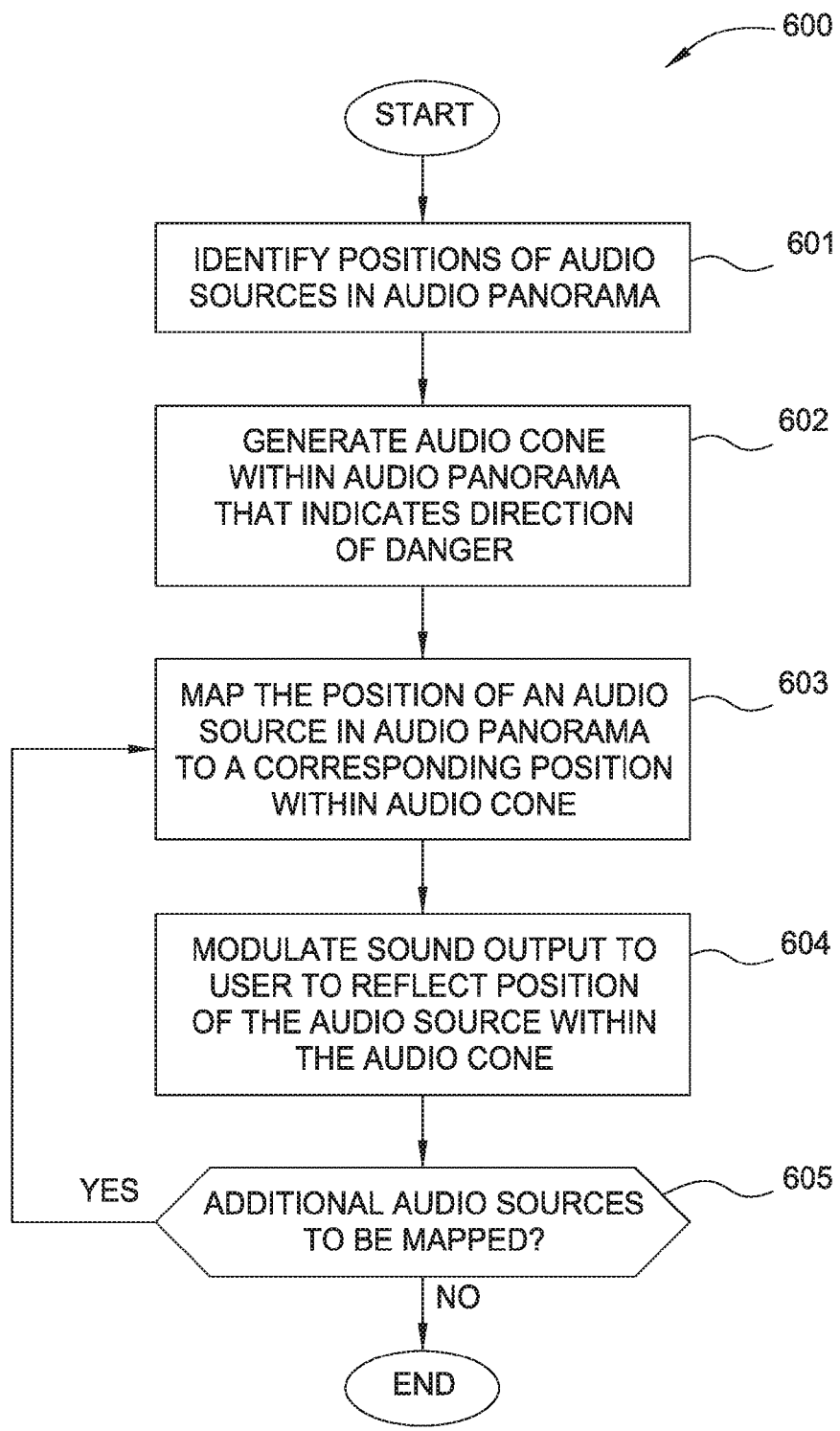
FIG. 6 is a flow diagram of method steps for mapping audio sources in an audio panorama to locations within an audio cone to indicate the presence of danger or other events of interest to a user of the personal safety system of FIGS. 1-4C, according to various embodiments of the present invention.

FIG. 6 is a flow diagram of method steps for mapping audio sources in an audio panorama to locations within an audio cone to indicate danger or other events of interest to a user of a personal safety device, according to one embodiment of the present invention. Although the method steps are described in conjunction with the systems of FIGS. 1A-4C, persons skilled in the art will understand that any system configured to perform the method steps, in any order, is within the scope of the present invention.

As shown, a method 600 begins at step 601, where personal safety system 120 identifies the positions of audio sources in an audio panorama that surrounds the user. The audio panorama could be, e.g. audio panorama 100, while the audio sources could be, e.g., sources 101, 102, and 103 of FIGS. 1A-1D.

At step 602, personal safety system 120 generates an audio cone within the audio panorama that indicates the direction of danger. The audio cone could be, e.g., audio cone 116 of FIGS. 1B-1D. Personal safety system 120 may identify the direction of danger by implementing step 502 of the method 500 described above. Personal safety system 120 generates audio cone with a particular directionality that is aligned with the direction of the danger relative to the head orientation of the user. The head orientation of the user could be determined by performing step 503 of the method 500.

At step 603, personal safety system 120 maps the position of an audio source in the audio panorama to a corresponding position within the audio cone. Personal safety system 120 could, for example, map the positions of sources 101, 102, and 103, shown in FIG. 1A to the new positions of those sources shown in FIG. 1D. Personal safety system 120 may determine a new position for a given source within the audio cone by compressing audio panorama, in an angular fashion, from a full 360 degrees down to a smaller number of degrees. Personal safety system 120 may also determine a new position for a source based on input received from the user, such as, e.g. hand gestures, among other types of input. In one embodiment, personal safety system 120 manipulates the distribution of channels to speakers in order to compress portions of the audio panorama. In another embodiment, personal safety system 120 assigns each audio source to a separate channel, and then manipulates the distribution of those separate channels in order to move audio sources independently.

At step 604, personal safety system 120 modulates sound that is output to the user to reflect the new position of the source within the audio cone. In doing so, personal safety system 120 may rely on 3D audio techniques, noise cancellation techniques, and a wide variety of other audio conditioning techniques in order to enhance the realism of the audio source.

At step 605, personal safety system 120 determines whether additional audio sources need to be mapped. If additional audio sources remain, then the method returns to step 603 and proceeds to map another audio source. Otherwise, the method 600 ends.

With this approach, personal safety system 120 compresses audio panorama down to a smaller audio cone by relocating each individual audio source separately. Personal safety system 120 may implement different techniques when relocating each such source, and may also selectively relocate certain sources while abstaining from relocating others. For example, personal safety system could relocate loud sounds to induce the perception that those sounds originate from the direction of danger, while abstaining from relocating softer ambient sounds. Persons skilled in the art will understand that personal safety system may implement a wide variety of different techniques for selecting a specific position for a particular audio source. Accordingly, any such technique that repositions each source independently of the others falls within the scope of the present invention.

Figure 7:
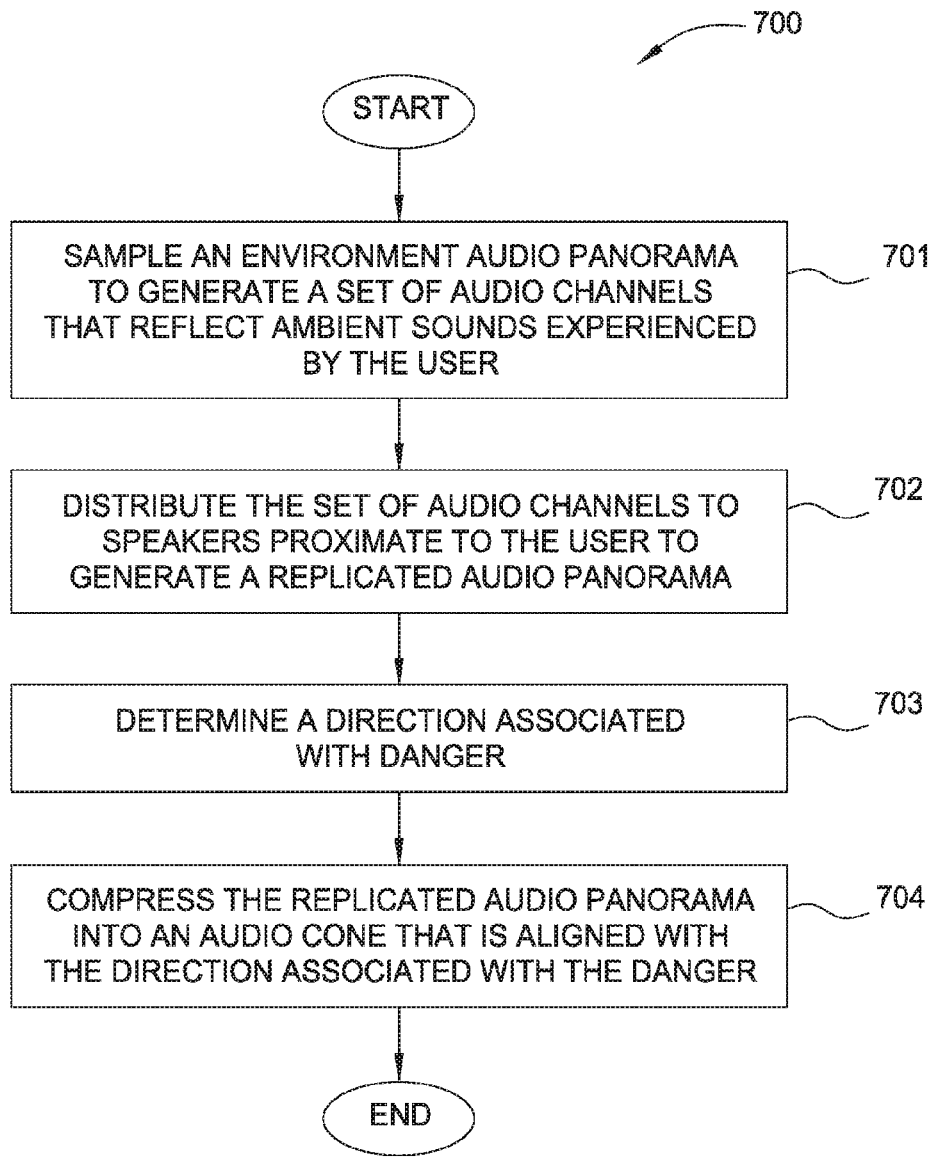
FIG. 7 is a flow diagram of method steps for replicating an environment audio panorama and compressing the replicated audio panorama to an audio cone to indicate the presence of danger or other events of interest to a user of the personal safety system of FIGS. 1-4C, according to various embodiments of the present invention.

FIG. 7 is a flow diagram of method steps for replicating an environment audio panorama and compressing the replicated audio panorama to an audio cone to indicate the presence of danger or other events of interest to a user of the personal safety system of FIGS. 1A-4C, according to one embodiment of the present invention. Although the method steps are described in conjunction with the systems of FIGS. 1A-4C, persons skilled in the art will understand that any system configured to perform the method steps, in any order, is within the scope of the present invention.

As shown, a method 700 begins at step 701, where personal safety system 120 samples an environment audio panorama to generate a first set of audio channels that reflect ambient sounds experience by user 110. The environment audio panorama could be, for example, environment audio panorama 300-1 of FIG. 3A or environment audio panorama 400-1 of FIG. 4A. Personal safety system 120 is configured to sample the environment audio panorama via a set of transducers, such as, e.g., microphones 310 of FIG. 3A or microphone cluster 410 of FIG. 4A. Initially, personal safety system 120 may assign the output of each such transducer to a different audio channel. Personal safety system 120 may also filter the sampled audio and identify individual sources of sound to be assigned to individual channels, in the fashion described above in conjunction with FIG. 6.

At step 702, personal safety system 120 distributes the set of audio channels to speakers proximate to user 110 to generate a replicated audio panorama. In doing so, personal safety system 120 may distribute a left channel to a left speaker and a right channel to a right speaker in the fashion described above in conjunction with FIG. 3B. The replicated audio panorama may be replicated audio panorama 300-2 or 400-2 of FIGS. 3B and 4B, respectively.

At step 704, personal safety system 120 determines a direction associated with danger or other event of interest. Personal safety system 120 may identify the direction associated with the danger or other event of interest by processing video or other image-based data with computer vision techniques to identify specific occurrences of real-world objects, such as cars, animals, or pedestrians. Personal safety system 120 may also identify any object traveling along an approach trajectory towards user 110. As a general matter, personal safety system 120 may be configured to identify any real-world object(s) or event(s), and identify a direction associated with the object(s) or event(s) relative to user 110.

At step 705, personal safety system 120 compresses the replicated audio panorama into an audio cone that is aligned with the direction associated with the danger. When compressing the replicated audio panorama, personal safety system 120 may redistribute the set of audio channels to the speakers proximate to the user in order to induce the illusion that the replicated audio panorama is compressed, as also shown in FIGS. 3C, 3D, and 4C. Personal safety system 120 may also redistribute each channel associated with each individual source of audio so that those sources of audio appear to originate from within the audio cone. In either case, personal safety system 120 compresses the replicated audio panorama to the audio cone while maintaining the relative angular positions of those sources.

Personal safety system 120 may thus act as a "pass-through" device in order to replicate ambient sounds associated with the environment audio panorama for perception by user 110. Then, personal safety system 120 may modify the replicated audio panorama to draw the attention of user 110 towards danger or other events of interest.

Figure 8:
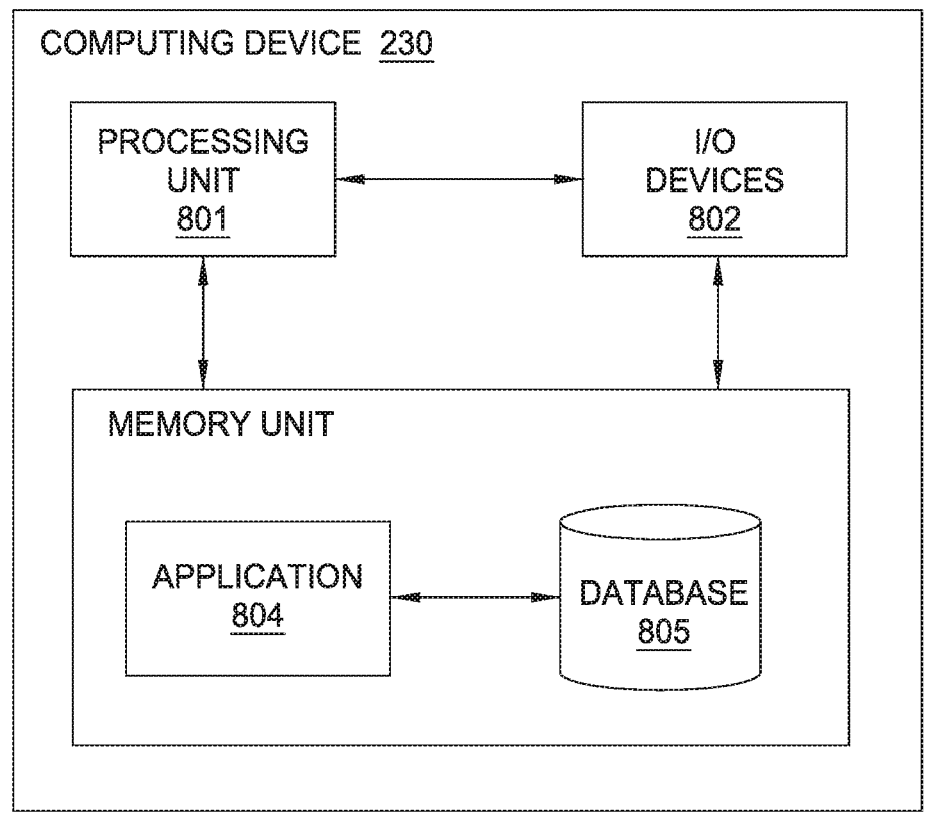
FIG. 8 is an exemplary computing device that may be included within the personal safety system of FIGS. 1A-4C, according to various embodiments of the present invention.

FIG. 8 is a block diagram illustrating a computing device 230 that may be included within personal safety system 120, according to one embodiment of the present invention. As shown, computing device 230 includes a processing unit 801, input/output (I/O) devices 802, and a memory unit 803, each of which is coupled with the others. Memory unit 803 includes an application 804 configured to interact with a database 805.

Processing unit 801 may include a central processing unit (CPU), digital signal processing unit (DSP), and so forth. I/O devices 802 may include input devices, output devices, and devices capable of both receiving input and providing output. Memory unit 803 may be a memory module or collection of memory modules. Software application 804 within memory unit 803 may be executed by processing unit 801 to implement the overall functionality of computing device 230, and, thus, to coordinate the operation of personal safety system 120 as a whole.

Computing device 230 may be coupled to a sensor array that includes one or more sensors, such as, e.g. microphone cluster 410. The sensor array is configured to measure various properties of the environment within which user 110 resides, as well as various properties associated with user 110. The sensor array may include any number of microphones, video cameras, touch sensors, wind sensors, heat sensors, light sensors, electrical field detectors, radio transceivers, global positioning system (GPS) receivers, or any other type of sensor. Generally, the sensor array captures sensory data associated with the environment, and sensory data associated with user 110, and provides that data to computing device 230.

Computing device 230 may also be coupled to audio output devices that include one or more devices configured to generate acoustic output and to cause user 110 to perceive that acoustic output, such as, e.g., speakers 240. The audio output devices may include any number of speakers, headphones, in-ear audio devices, or any other type of device capable of generating sound. Generally, the audio output devices are configured to generate natural sounds derived from the environment, anti-noise that cancels particular sounds, and modulated sounds generated based on environmental sounds.

Computing device 120 as a whole may be a microprocessor, an application-specific integrated circuit (ASIC), a system-on-a-chip (SoC), a mobile computing device such as a tablet computer or cell phone, and so forth. Generally, computing device 230 is configured to coordinate the overall operation of personal safety system 120. Any technically feasible system configured to implement the functionality of personal safety system 120 falls within the scope of the present invention.

In practice, computing device 230 is configured to receive environmental data from the sensor array coupled thereto and to identify events of interest, such as a particular danger that may pose a potential threat, to user 110. For example, computing device 230 could implement computer vision techniques to identify an automobile traveling on a collision course with user 110. Alternatively, computing device 230 could implement sound recognition techniques to identify sounds commonly associated with dangerous entities, such as, e.g., dangerous animals. Computing device 230 is also configured to identify a direction associated with the danger or other event of interest. In addition, computing device 230 is also configured to receive data from the sensor array associated with user 110 and to identify a direction that user 110 is facing. For example, referring to FIGS. 1A-1D, computing device 230 could identify that the head of user 110 is facing towards direction 112 or that the eyes of user 110 are aligned with direction 112.

Computing device 230 then causes the audio output devices coupled thereto to generate acoustic output that represents a modified version of audio panorama 100 shown in FIGS. 1A-1D. For example, computing device 230 could cause audio output devices 210 to cancel all audio sources within audio panorama 100 except those originating from the direction of danger, in similar fashion as described above in conjunction with FIG. 1B. In another example, computing device 230 could cause audio output devices 210 to generate acoustic output that represents a collapsed version of audio panorama 100, in similar fashion as discussed in conjunction with FIG. 1C. In yet another example, computing device 230 could cause audio output devices 210 to generate acoustic output that represents a compressed version of audio panorama 100, in similar fashion as discussed in conjunction with FIG. 1D.

In performing any of the exemplary functions described above, computing device 230 selectively cancels and/or modulates audio panorama 100 relative to direction 112 that user 110 is facing and relative to the direction of danger. For example, if computing device 230 determines that danger is imminent towards the right of direction 112 that user is facing, then computing device 230 would cause the audio output devices to generate acoustic output that would draw the auditory perception of user 110 towards the right side of the user 110. In doing so, computing device 230 may isolate, collapse, or compress portions of audio panorama 100 to generate a modified version of that panorama that is generally oriented towards the left side of direction 112.

In addition, computing device 230 may implement 3D sound conditioning techniques to modify or improve the quality of sound that is output to user 110. For example, when generating an audio panorama via headphones or in-ear audio devices, although those particular audio devices bypass the outer ear of user 120, computing device 230 may modulate the audio output to simulate the passage of sound across the outer ear of user 120. With this approach, computing device 230 may replicate a natural audio environment. Computing device 230 may also passively replay an ambient audio panorama to user 110 prior to danger being detected, thereby acting as a "pass-through" device. Upon a danger or other event of interest being detected, computing device 230 could modify that audio panorama using the aforementioned techniques.

In sum, a personal safety system detects imminent danger or other event of interest and then modifies an audio panorama perceived by a user to focus the attention of the user towards the direction of the danger or other event of interest. In doing so, the personal safety system may isolate sounds originating from the direction of the danger or other event of interest, collapse the audio panorama towards the direction of the danger or other event of interest, or compress the audio panorama, in an angular fashion, to align with the direction of the danger or other event of interest. The personal safety system may be integrated into an automobile or a wearable system physically attached to the user.

One advantage of the disclosed technique is that the attention of the user may be drawn towards imminent danger or other event of interest without introducing additional sensory information to the user. Thus, the user may be made aware of the danger or other event of interest without becoming startled or distracted. In addition, the approach described herein may align closely with the existing intuition of the user because the user may naturally turn to face a direction of changing auditory perception that is caused by the personal safety system. Since that auditory perception does not convey distracting, artificial sounds, the user may turn to face danger unconsciously, and therefore retain sufficient cognitive resources to properly respond to that danger or other event of interest. When integrated into an automobile, the disclosed system may reduce the risk of automobile accidents by causing the user to perceive imminent danger or other event of interest without provoking alarm. Likewise, when integrated into a wearable system worn by a pedestrian, the disclosed system may reduce the risk of pedestrian accidents in like fashion. The personal safety system of the present invention therefore represents a significant advance in preserving the personal safety of human beings.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. For example, although many of the descriptions herein refer to a danger or a threat (e.g., danger 114), persons skilled in the art will appreciate that the systems and techniques described herein are applicable to directing a user's focus and/or attention to any other type of event of interest. The foregoing description and drawings are, accordingly, to be regarded in an illustrative rather than a restrictive sense.

Therefore, the scope of embodiments of the present invention is set forth in the claims that follow.

The claimed invention is:

1. A system configured to indicate the presence of an event of interest to a user, the system comprising:
   a processor configured to:
      sample an audio panorama of a surrounding environment;
      determine a location associated with the event of interest; and
      generate at least one signal associated with the sampled audio panorama based on the location associated with the event of interest; and
   a plurality of audio output devices configured to output the at least one signal to the user so that at least a portion of the audio panorama is perceived from the location associated with the event of interest.

2. The system of claim 1, wherein generating the at least one signal associated with the sampled audio panorama comprises generating at least one noise cancellation signal, and at least one audio output device included in the plurality of audio output devices is configured to output the at least one noise cancellation signal in order to cancel a sound that is outside of the location associated with the event of interest.

3. The system of claim 1, wherein sampling the audio panorama of the surrounding environment comprises sampling an initial audio panorama of an environment of the user, the initial audio panorama including a first sound at a first location within the initial audio panorama and a second sound at a second location within the initial audio panorama,
wherein generating the at least one signal associated with the sampled audio panorama comprises spatially compressing the first sound and the second sound towards the location associated with the event of interest.

4. The system of claim 3, wherein spatially compressing the first sound and the second sound towards the location associated with the event of interest comprises reducing, in the audio panorama, at least one of an angle and a distance between the first sound and the second sound.

5. The system of claim 1, wherein sampling the audio panorama of the surrounding environment comprises sampling an initial audio panorama of an environment of the user, the initial audio panorama including a first sound at a first location within the initial audio panorama, a second sound at a second location within the initial audio panorama, and a third sound at a third location within the initial audio panorama,
wherein generating the at least one signal associated with the sampled audio panorama comprises reducing at least one of a first angle and a first distance between the first sound and the second sound and at least one of a second angle and a second distance between the second sound and the third sound while maintaining a relative angular positioning between the first sound, the second sound, and the third sound.

6. The system of claim 1, wherein sampling the audio panorama of the surrounding environment comprises sampling an initial audio panorama of an environment of the user, the initial audio panorama including a first sound at a first location within the initial audio panorama and a second sound at a second location within the initial audio panorama,
wherein generating the at least one signal associated with the sampled audio panorama comprises spatially collapsing the first sound and the second sound to the location associated with the event of interest.

7. The system of claim 1, wherein the plurality of audio output devices are coupled to a user-wearable computing device.

8. The system of claim 1, wherein the plurality of audio output devices are configured to output the audio panorama inside of a vehicle occupied by the user.

9. The system of claim 1, further comprising a set of audio transducers coupled to the exterior of a vehicle occupied by the user and configured to sample an initial audio panorama, wherein the at least one signal associated with the sampled audio panorama is generated based on the initial audio panorama.

10. A non-transitory computer-readable medium including instructions that, when executed by a processor, cause the processor to indicate the presence of an event of interest to a user, by performing the steps of:
sampling an audio panorama of a surrounding environment;
determining a location associated with the event of interest;
generating at least one signal associated with the sampled audio panorama based on the location associated with the event of interest; and
transmitting the at least one signal to a plurality of audio output devices to output the audio panorama so that at least a portion of the audio panorama is perceived from the location associated with the event of interest.

11. The non-transitory computer-readable medium of claim 10, wherein generating the at least one signal associated with the sampled audio panorama comprises generating at least one noise cancellation signal that, when outputted by at least one audio output device included in the plurality of audio output devices, cancels at least a portion of ambient sounds proximate to the user that originate from locations different than the location associated with the event of interest.

12. The non-transitory computer-readable medium of claim 10, wherein generating the at least one signal associated with the sampled audio panorama comprises:
generating at least one noise cancellation signal that, when outputted by at least one audio output device included in the plurality of audio output devices, cancels ambient sounds proximate to the user; and
collapsing the ambient sounds proximate to the user to a mono-aural audio source that is aligned with the location associated with the event of interest.

13. The non-transitory computer-readable medium of claim 10, wherein generating the at least one signal associated with the sampled audio panorama comprises:
generating at least one noise cancellation signal that, when outputted by at least one audio output device included in the plurality of audio output devices, cancels ambient sounds proximate to the user; and
compressing the ambient sounds proximate to the user into the audio panorama.

14. The non-transitory computer-readable medium of claim 13, wherein compressing the ambient sounds proximate to the user into the audio panorama comprises:
identifying a first sound within the ambient sounds proximate to the user that is associated with a first location; and
reducing an angle between the first location and a vector that corresponds to the location associated with the event of interest.

15. A computer-implemented method indicating the presence of an event of interest to a user, comprising:
sampling an audio panorama of a surrounding environment;
determining a location associated with the event of interest;
generating at least one signal associated with the sampled audio panorama based on the location associated with the event of interest; and
transmitting the at least one signal to a plurality of audio output devices to output the audio panorama so that at least a portion of the audio panorama is perceived from the location associated with the event of interest.

16. The computer-implemented method of claim 15, wherein generating the at least one signal associated with the sampled audio panorama comprises generating at least one noise cancellation signal, and at least one audio output device included in the plurality of audio output devices outputs the at least one noise cancellation signal in order to cancel a sound that is outside of the location associated with the event of interest.

17. The computer-implemented method of claim 15, wherein sampling the audio panorama of the surrounding environment comprises sampling an initial audio panorama of an environment of the user, the initial audio panorama including a first sound at a first location within the initial audio panorama and a second sound at a second location within the initial audio panorama,
  wherein generating the at least one signal associated with the sampled audio panorama comprises spatially compressing the first sound and the second sound towards the location associated with the event of interest.

18. The computer-implemented method of claim 17, wherein spatially compressing the first sound and the second sound towards the location associated with the event of interest comprises reducing, in the audio panorama, at least one of an angle and a distance between the first sound and the second sound.

19. The computer-implemented method of claim 15, wherein sampling the audio panorama of the surrounding environment comprises sampling an initial audio panorama of an environment of the user, the initial audio panorama including a first sound at a first location within the initial audio panorama, a second sound at a second location within the initial audio panorama, and a third sound at a third location within the initial audio panorama,
  wherein generating the at least one signal associated with the sampled audio panorama comprises reducing at least one of a first angle and a first distance between the first sound and the second sound and at least one of a second angle and a second distance between the second sound and the third sound while maintaining a relative angular positioning between the first sound, the second sound, and the third sound.

20. The computer-implemented method of claim 15, wherein sampling the audio panorama of the surrounding environment comprises sampling an initial audio panorama of an environment of the user, the initial audio panorama including a first sound at a first location within the initial audio panorama and a second sound at a second location within the initial audio panorama,
  wherein generating the at least one signal associated with the sampled audio panorama comprises spatially collapsing the first sound and the second sound to the location associated with the event of interest.

* * * * *